US012772221B2

(12) United States Patent
Tanaka et al.

(10) Patent No.: US 12,772,221 B2
(45) Date of Patent: Oct. 20, 2026

(54) WIRELESS COMMUNICATION DEVICE AND METHOD

(71) Applicant: SONY GROUP CORPORATION, Tokyo (JP)

(72) Inventors: Ken Tanaka, Tokyo (JP); Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 487 days.

(21) Appl. No.: 17/624,017

(22) PCT Filed: Jun. 25, 2020

(86) PCT No.: PCT/JP2020/024972
§ 371 (c)(1),
(2) Date: Dec. 30, 2021

(87) PCT Pub. No.: WO2021/006049
PCT Pub. Date: Jan. 14, 2021

(65) Prior Publication Data

US 2022/0353864 A1 Nov. 3, 2022

(30) Foreign Application Priority Data

Jul. 9, 2019 (JP) ................................ 2019-127334

(51) Int. Cl.
*H04W 72/0453* (2023.01)
*H04W 8/24* (2009.01)
*H04W 72/20* (2023.01)

(52) U.S. Cl.
CPC ......... *H04W 72/0453* (2013.01); *H04W 8/24* (2013.01); *H04W 72/20* (2023.01)

(58) Field of Classification Search
CPC ... H04W 72/0453; H04W 8/24; H04W 72/20; H04W 84/12; H04W 88/06; H04W 88/10;
(Continued)

(56) References Cited

U.S. PATENT DOCUMENTS

2010/0074190 A1* 3/2010 Cordeiro ............... H04W 48/16
370/329
2011/0255455 A1 10/2011 Seok
(Continued)

FOREIGN PATENT DOCUMENTS

CN 101714893 A 5/2010
CN 102771168 A 11/2012
(Continued)

OTHER PUBLICATIONS

International Search Report and Written Opinion of PCT Application No. PCT/JP2020/024972, issued on Sep. 1, 2020, 11 pages of ISRWO.

(Continued)

*Primary Examiner* — Chirag G Shah
*Assistant Examiner* — Joshua Smith
(74) *Attorney, Agent, or Firm* — CHIP LAW GROUP

(57) ABSTRACT

The present disclosure relates to a wireless communication device and a method that make it possible to suppress an increase in transmission standby time. A wireless communication unit capable of wireless communication in a plurality of frequency bands is controlled to transmit a control signal in a second frequency band in which transmission is possible, the control signal being for wireless communication in a first frequency band. Additionally, a wireless communication unit capable of wireless communication in a plurality of frequency bands is controlled to receive a control signal in a second frequency band in which reception is possible, the control signal being for wireless communication in a first frequency band. The present disclosure can be applied, for example, to wireless communication devices, electronic devices, wireless communication methods, programs, and the like.

19 Claims, 19 Drawing Sheets

(58) Field of Classification Search
CPC ............. H04L 25/0204; H04L 25/0224; H04L 27/2602; H04L 5/001; H04L 5/0064; H04L 5/0078; H04L 5/0092; H04L 27/0006; H04L 5/0053
See application file for complete search history.

(56) References Cited

U.S. PATENT DOCUMENTS

| | | | | |
|---|---|---|---|---|
| 2011/0261764 | A1* | 10/2011 | Shirakata ............ | H04W 72/541 370/329 |
| 2013/0010719 | A1 | 1/2013 | Shapira | |
| 2013/0195071 | A1* | 8/2013 | Ohta ..................... | H04W 72/02 370/329 |
| 2015/0105121 | A1 | 4/2015 | Emmanuel et al. | |
| 2016/0374086 | A1 | 12/2016 | Gupta et al. | |
| 2018/0084582 | A1* | 3/2018 | Liu ................... | H04W 74/0808 |
| 2019/0082373 | A1* | 3/2019 | Patil ...................... | H04W 72/00 |
| 2019/0297674 | A1* | 9/2019 | Min .................. | H04W 72/0453 |
| 2022/0191930 | A1 | 6/2022 | Aio et al. | |
| 2022/0231824 | A1* | 7/2022 | Dong ...................... | H04L 5/001 |

FOREIGN PATENT DOCUMENTS

| | | | |
|---|---|---|---|
| CN | 104717768 | A | 6/2015 |
| EP | 2575396 | A2 | 4/2013 |
| EP | 3962142 | A1 | 3/2022 |
| JP | 2014-017885 | A | 1/2014 |
| JP | 2017-163236 | A | 9/2017 |
| JP | 2018-170621 | A | 11/2018 |
| JP | 2019-087916 | A | 6/2019 |
| KR | 10-2012-0127444 | A | 11/2012 |
| WO | 2010/036595 | A2 | 4/2010 |
| WO | 2011/099151 | A1 | 8/2011 |
| WO | 2020/174823 | A1 | 9/2020 |

OTHER PUBLICATIONS

Chu, et al., "Multiple band Operation discussion," IEEE 802.11-19/0821r0, May 14, 2019, 07 pages.

Extended European Search Report of EP Application No. 20837483.5, issued on Jul. 21, 2022, 15 pages.

* cited by examiner

WIRELESS COMMUNICATION DEVICE AND METHOD

CROSS REFERENCE TO RELATED APPLICATIONS

This application is a U.S. National Phase of International Patent Application No. PCT/JP2020/024972 filed on Jun. 25, 2020, which claims priority benefit of Japanese Patent Application No. JP 2019-127334 filed in the Japan Patent Office on Jul. 9, 2019. Each of the above-referenced applications is hereby incorporated herein by reference in its entirety.

TECHNICAL FIELD

The present disclosure relates to a wireless communication device and a method, and particularly relates to a wireless communication device and a method that make it possible to suppress an increase in transmission standby time.

BACKGROUND ART

In recent years, wireless communication applications have become more diverse with the proliferation and increase in performance of wireless communication terminal devices. In particular, transmitting high-definition video instantaneously requires instantaneous wireless transmission at a high peak rate, and wideband transmission (multiband transmission), which combines a plurality of different frequency bands, has been considered as a means to achieve this.

In multiband transmission, it is necessary to use a plurality of different frequency bands simultaneously in order to satisfy the required communication rate. In multiband transmission using a random access scheme as typified by wireless Local Area Network (LAN), a method of acquiring transmission rights for multiband transmission is conceivable in which transmission rights are acquired for each frequency band independently after a random standby time (backoff) has passed.

However, if the backoff for some frequency bands is relatively long, the standby time until the transmission rights for multiband transmission are acquired may increase. There has also been a risk of another wireless communication terminal device acquiring the transmission rights for such frequency bands where there is a long backoff. These issues may reduce opportunities to acquire transmission rights for multiband transmission in a random access scheme.

Accordingly, a method has been considered in which a transmission terminal device determines the frequency bands to be used for multiband transmission by sensing past communication traffic and predicting the availability of frequency bands immediately thereafter in order for the transmission terminal device to acquire transmission rights for multiband transmission (e.g., PTL 1).

CITATION LIST

Patent Literature

PTL 1

JP 2018-170621 A

SUMMARY

Technical Problem

However, it has been difficult to implement this method due to limitations resulting from a need to synchronize the backoffs of different frequency bands within the transmission terminal device, the accuracy of predicting the availability information of the frequency bands depending on trends in the communication traffic, and the like.

Having been achieved in light of such a situation, the present disclosure is directed to suppress an increase in transmission standby times.

Solution to Problem

A wireless communication device according to one aspect of the present technique includes: a wireless communication unit capable of wireless communication in a plurality of frequency bands; and a control unit that controls the wireless communication unit to transmit a control signal in a second frequency band in which transmission is possible, the control signal being for wireless communication in a first frequency band.

A wireless communication method according to one aspect of the present technique includes: controlling a wireless communication unit capable of wireless communication in a plurality of frequency bands to transmit a control signal in a second frequency band in which transmission is possible, the control signal being for wireless communication in a first frequency band.

A wireless communication device according to another aspect of the present technique includes: a wireless communication unit capable of wireless communication in a plurality of frequency bands; and a control unit that controls the wireless communication unit to receive a control signal in a second frequency band in which reception is possible, the control signal being for wireless communication in a first frequency band.

A wireless communication method according to another aspect of the present technique includes: controlling a wireless communication unit capable of wireless communication in a plurality of frequency bands to receive a control signal in a second frequency band in which reception is possible, the control signal being for wireless communication in a first frequency band.

In the wireless communication device and method, as well as in a program, according to one aspect of the present technique, a wireless communication unit capable of wireless communication in a plurality of frequency bands is controlled to transmit a control signal in a second frequency band in which transmission is possible, the control signal being for wireless communication in a first frequency band.

In the wireless communication device and method, as well as in a program, according to another aspect of the present technique, a wireless communication unit capable of wireless communication in a plurality of frequency bands is controlled to receive a control signal in a second frequency band in which reception is possible, the control signal being for wireless communication in a first frequency band.

DESCRIPTION OF EMBODIMENTS

Figure 1:
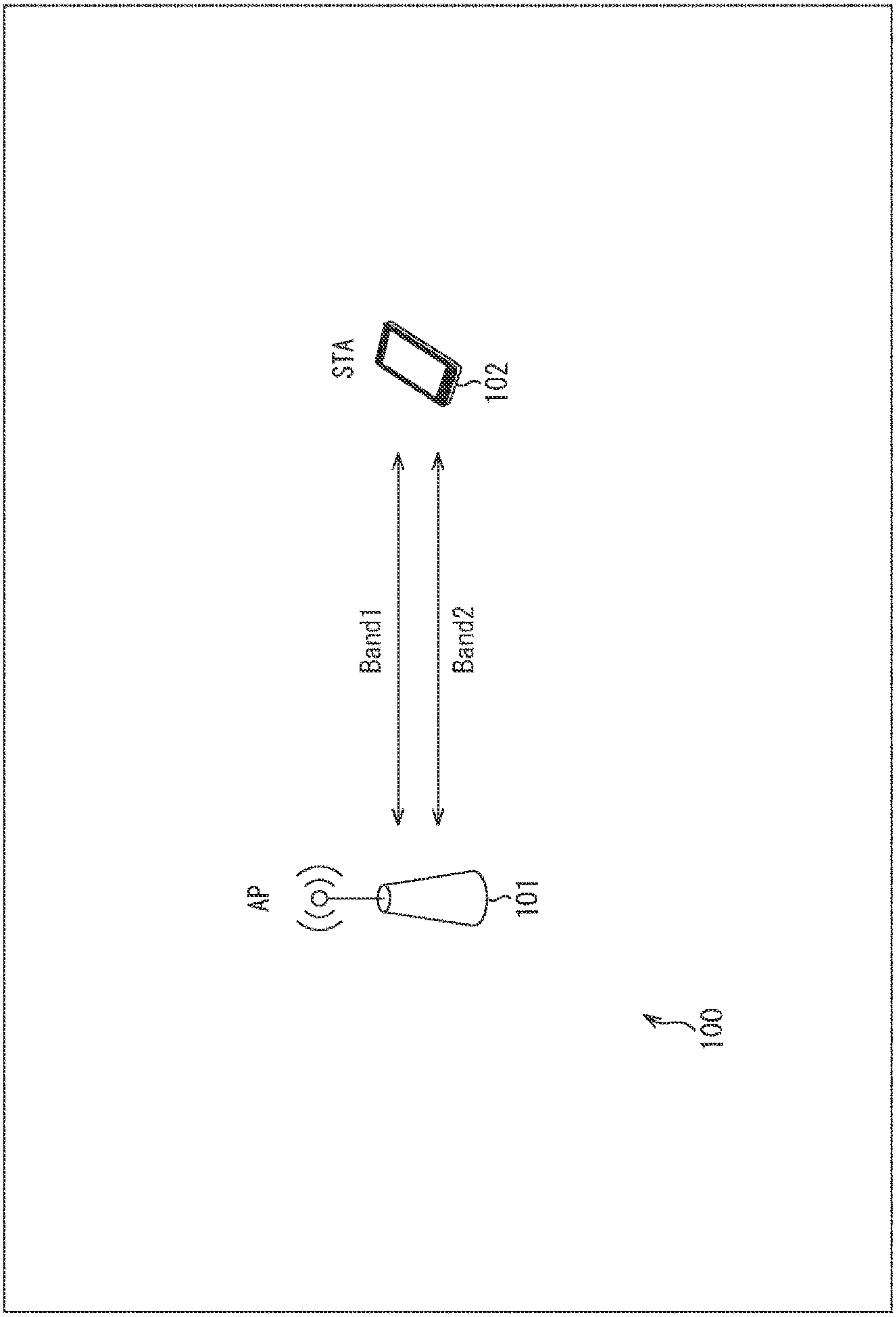
FIG. 1 is a diagram illustrating an example of the main configuration of a wireless communication system.

Hereinafter, modes for carrying out the present disclosure (hereinafter referred to as “embodiments”) will be described. The descriptions will be given in the following order.

1. First Embodiment (Determination of Frequency Bands by Base Station)
2. Second Embodiment (Determination of Frequency Bands by Terminal Device)
3. Supplementary Notes

1. First Embodiment

<Multiband Transmission>

In recent years, wireless communication applications have become more diverse with the proliferation and increase in performance of wireless communication terminal devices. In particular, transmitting high-definition video instantaneously requires instantaneous wireless transmission at a high peak rate, and wideband transmission (multiband transmission), which combines a plurality of different frequency bands, has been considered as a means to achieve this.

In multiband transmission, it is necessary to use a plurality of different frequency bands simultaneously in order to satisfy the required communication rate. In multiband transmission using a random access scheme as typified by wireless Local Area Network (LAN), a method of acquiring transmission rights for multiband transmission is conceivable in which transmission rights are acquired for each frequency band independently after a random standby time (backoff) has passed.

However, if the backoff for some frequency bands is relatively long, the standby time until the transmission rights for multiband transmission are acquired may increase. There has also been a risk of another wireless communication terminal device acquiring the transmission rights for such frequency bands where there is a long backoff. These issues may reduce opportunities to acquire transmission rights for multiband transmission in a random access scheme.

Accordingly, a method has been considered in which a transmission terminal device determines the frequency bands to be used for multiband transmission by sensing past communication traffic and predicting the availability of frequency bands immediately thereafter in order for the transmission terminal device to acquire transmission rights for multiband transmission, as described in PTL 1, for example.

However, it has been difficult to implement this method due to limitations resulting from a need to synchronize the backoffs of different frequency bands within the transmission terminal device, the accuracy of predicting the availability information of the frequency bands depending on trends in the communication traffic, and the like.

<Transmission of Control Signal>

Accordingly, the wireless communication unit capable of wireless communication in a plurality of frequency bands is controlled to transmit a control signal in a second frequency band in which transmission is possible, the control signal being for wireless communication in a first frequency band. For example, a wireless communication device is provided with: a wireless communication unit capable of wireless communication in a plurality of frequency bands; and a control unit that controls the wireless communication unit to transmit a control signal in a second frequency band in which transmission is possible, the control signal being for wireless communication in a first frequency band. Additionally, for example, a program causes a computer to function as a control unit that controls the wireless communication unit capable of wireless communication in a plurality of frequency bands to transmit a control signal in a second frequency band in which transmission is possible, the control signal being for wireless communication in a first frequency band.

Doing so makes it possible to attempt to acquire transmission rights in a frequency band having a long backoff, using a frequency band in which transmission is possible. Accordingly, an increase in transmission standby time can be suppressed, even in a frequency band having a long backoff. This makes it possible to suppress a drop in opportunities to acquire transmission rights for multiband transmission in a random access scheme (typically, increase the opportunities to acquire transmission rights for multiband transmission).

<Reception of Control Signal>

Additionally, the wireless communication unit capable of wireless communication in a plurality of frequency bands is controlled to receive a control signal in a second frequency band in which reception is possible, the control signal being for wireless communication in a first frequency band. For example, a wireless communication device is provided with: a wireless communication unit capable of wireless communication in a plurality of frequency bands; and a control unit that controls the wireless communication unit to receive a control signal in a second frequency band in which reception is possible, the control signal being for wireless communication in a first frequency band. Additionally, for example, a program causes a computer to function as a control unit that controls the wireless communication unit capable of wireless communication in a plurality of frequency bands to receive a control signal in a second frequency band in which reception is possible, the control signal being for wireless communication in a first frequency band.

Doing so makes it possible to provide transmission rights in a frequency band having a long backoff, using a frequency band in which transmission is possible. Accordingly, an increase in transmission standby time can be suppressed, even in a frequency band having a long backoff. This makes it possible to suppress a drop in opportunities to acquire transmission rights for multiband transmission in a random access scheme (typically, increase the opportunities to acquire transmission rights for multiband transmission).

<Wireless Communication System>

FIG. 1 is a block diagram illustrating an example of the main configuration of one aspect of a wireless communication system in which the present technique is applied. A wireless communication system 100 illustrated in FIG. 1 is a system that performs wireless communication, and is a system capable of performing wireless communication using a plurality of mutually-different frequency bands (also called multiband transmission). As illustrated in FIG. 1, the wireless communication system 100 includes a base station (also referred to as “AP”) 101 and a terminal device (also referred to as “STA”) 102. In the following, the present technique will be described using an example in which there is one each of the base station 101 and the terminal device 102, but the wireless communication system 100 may be constituted by any number of base stations 101 and terminal devices 102, with a plurality of each, different numbers of each, and so on. For example, the wireless communication system 100 may be constituted by one base station 101 and three terminal devices 102. Or, for example, the wireless communication system 100 may be constituted by two base stations 101 and five terminal devices 102.

The base station (AP) 101 and the terminal device (STA) 102 can communicate wirelessly with each other (and can exchange information with each other through this wireless communication). At this time, the base station 101 and the terminal device 102 can perform multiband transmission using a plurality of mutually-different frequency bands (e.g., Band 1 and Band 2).

<Configuration of Base Station>

Figure 2:
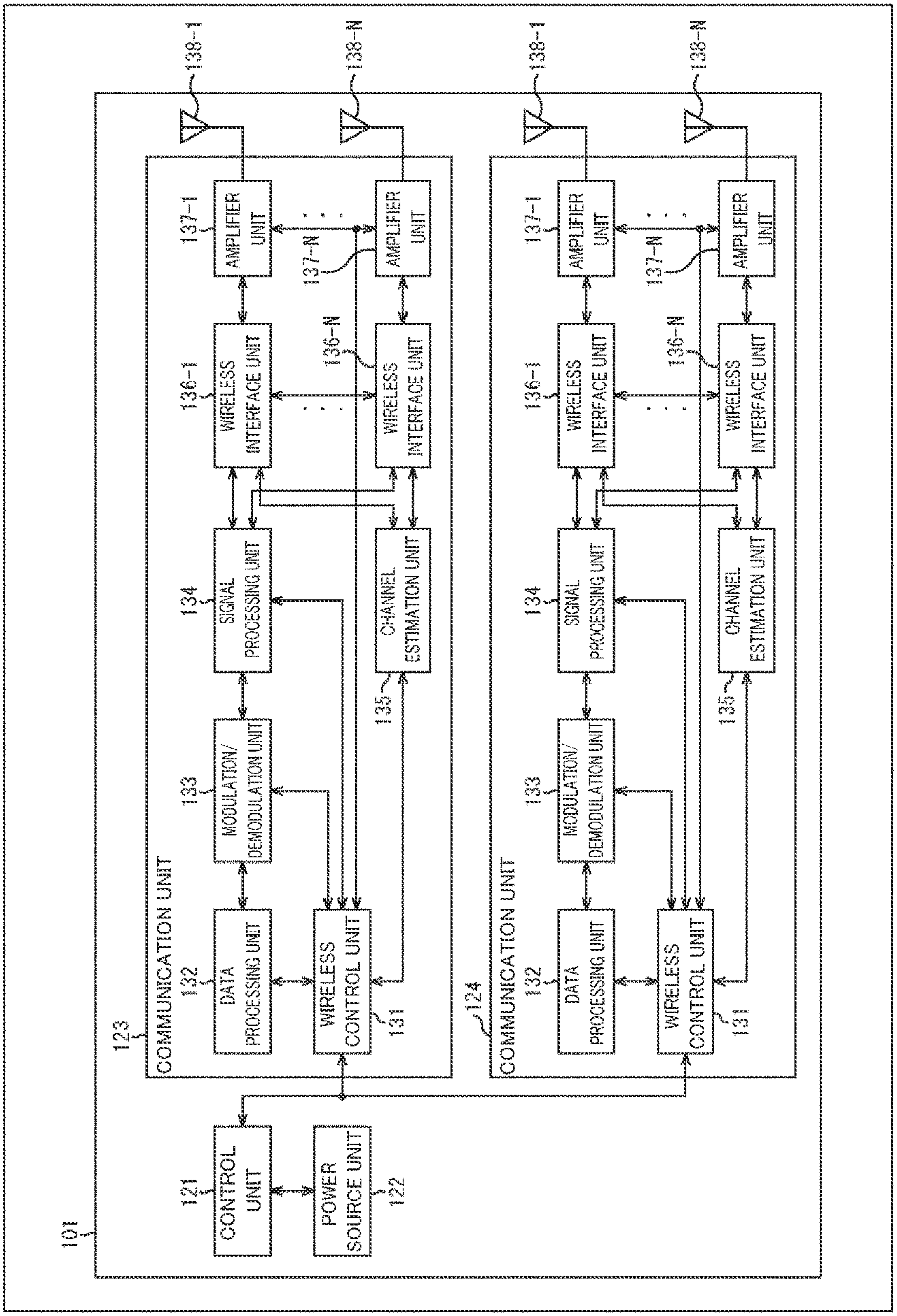
FIG. 2 is a block diagram illustrating an example of the main configuration of a base station.

The configurations of the devices will be described next. FIG. 2 is a block diagram illustrating an example of the main configuration of the base station 101. As illustrated in FIG. 2, the base station 101 includes a control unit 121, a power source unit 122, a communication unit 123, and a communication unit 124.

The control unit 121 controls the power source unit 122, as well as (a wireless control unit 131 of) the communication unit 123 and the communication unit 124. Note that the control unit 121 may execute at least some of the operations of the wireless control unit 131 instead of the wireless control unit 131.

The control unit 121 can have any desired configuration. For example, the control unit 121 may be configured as a logic circuit that implements the above-described processing. The control unit 121 may include, for example, a Central Processing Unit (CPU), Read Only Memory (ROM), Random Access Memory (RAM), and the like, and the above-described processing may be implemented by using these elements to execute a program. Of course, the control unit 121 may have both of these configurations, and some of the above-described processing may be implemented by a logic circuit, while other processing may be implemented by executing a program.

The power source unit 122 includes a battery power source or a fixed power source, and supplies power to the various units of the base station 101. For example, the power source unit 122 supplies power to the various units within the base station 101 such that the control unit 121, the wireless control unit 131, or the like can execute processing in which the present technique is applied.

The communication unit 123 and the communication unit 124 each performs processing related to wireless communication. The communication unit 123 and the communication unit 124 can perform wireless communication in mutually-different frequency bands. The communication unit 123 and the communication unit 124 can also control each other and exchange information. The communication unit 123 and the communication unit 124 may be implemented through LSI (Large Scale Integration).

The communication unit 123 includes the wireless control unit 131, a data processing unit 132, a modulation/demodulation unit 133, a signal processing unit 134, a channel estimation unit 135, a wireless interface unit 136-1 to a wireless interface unit 136-N, an amplifier unit 137-1 to an amplifier unit 137-N, and an antenna 138-1 to an antenna 138-N (where N is any natural number). In the following, when there is no need to distinguish among the wireless interface unit 136-1 to the wireless interface unit 136-N, the units will be referred to as a wireless interface unit 136. Additionally, when there is no need to distinguish among the amplifier unit 137-1 to the amplifier unit 137-N, the units will be referred to as an amplifier unit 137. Additionally, when there is no need to distinguish among the antenna 138-1 to the antenna 138-N, the antennas will be referred to as an antenna 138. The wireless interface unit 136, the amplifier unit 137, and the antenna 138 are taken as a set, and one set is provided for each channel handled by the communication unit 123.

The wireless control unit 131 can exchange information with each of the processing units in the communication unit 123. Additionally, the wireless control unit 131 can set parameters to be used in the modulation/demodulation unit 133, the signal processing unit 134, and the like. The wireless control unit 131 can control the scheduling of processing on packets, performed in the data processing unit 132. Additionally, the wireless control unit 131 can set parameters to be used in each wireless interface unit 136. Additionally, the wireless control unit 131 can set parameters to be used in each amplifier unit 137, each antenna 138, and the like, control transmission power, and the like.

During transmission, when data is input from an upper layer, the data processing unit 132 generates packets for wireless transmission from the data, and performs processing such as adding headers for Media Access Control (MAC) and adding error detection code. The data processing unit 132 also supplies the processed data to the modulation/demodulation unit 133. Conversely, during reception, when there is input from the modulation/demodulation unit 133, the data processing unit 132 performs MAC header analysis, packet error detection, reordering processing, and the like, and supplies the processed data to the upper layer of the protocol of the data processing unit 132 itself.

During transmission, the modulation/demodulation unit 133 performs processing such as coding, interleaving, and modulation on the input data from the data processing unit

132 on the basis of a coding method and a modulation method set in, for example, the wireless control unit 131, generates a data symbol stream, and supplies the stream to the signal processing unit 134. During reception, the modulation/demodulation unit 133 performs the opposite processing as that performed during transmission on the input from the signal processing unit 134 (reverse processing), and supplies a result of that processing as data to the data processing unit 132 or the wireless control unit 131.

During transmission, the signal processing unit 134 performs signal processing provided for spatial separation on the input from the modulation/demodulation unit 133 as necessary, and supplies the resulting one or more transmission symbol streams to the wireless interface unit 136 of each channel. During reception, the signal processing unit 134 performs signal processing on the reception symbol stream input from the wireless interface unit 136 of each channel, performs spatial separation of the stream as necessary, and supplies a result of the processing to the modulation/demodulation unit 133.

The channel estimation unit 135 calculates complex channel gain information of a propagation path from a preamble part and a training signal part of the input signal from the wireless interface unit 136 of each channel. The channel estimation unit 135 supplies the calculated complex channel gain information to the modulation/demodulation unit 133, the signal processing unit 134, and the like via the wireless control unit 131. The modulation/demodulation unit 133 uses the complex channel gain information for demodulation processing, for example. The signal processing unit 134 uses the complex channel gain information for spatial processing.

During transmission, the wireless interface unit 136 converts the input from the signal processing unit 134 into an analog signal, applies signal processing to the analog signal, such as filtering, up-conversion to a carrier frequency, and phase control, and supplies the processed analog signal to the antenna 138 or the amplifier unit 137 corresponding to the wireless interface unit 136 itself. During reception, the wireless interface unit 136 performs the opposite processing as that performed during transmission on the input from the antenna 138 or the amplifier unit 137 corresponding to the wireless interface unit 136 itself (reverse processing), and supplies the processed data to the signal processing unit 134 and the channel estimation unit 135.

During transmission, the amplifier unit 137 amplifies the analog signal input from the wireless interface unit 136 corresponding to the amplifier unit 137 itself to a predetermined power. The amplifier unit 137 also transmits the amplified analog signal to the antenna 138 corresponding to the amplifier unit 137 itself. During reception, the amplifier unit 137 amplifies the analog signal received via the antenna 138 corresponding to the amplifier unit 137 itself to a predetermined power. The amplifier unit 137 supplies the amplified analog signal to the wireless interface unit 136 corresponding to the amplifier unit 137 itself.

Note that the communication unit 123 may have processing units aside from the above-described processing units. Additionally, some of the above-described processing units may be omitted. Additionally, the wireless interface unit 136, the amplifier unit 137, and the antenna 138 may be taken as one set, and one or more of those sets may serve as a constituent element of the communication unit 123. Note also that the numbers of the wireless interface unit 136, the amplifier unit 137, and the antenna 138 may be the same as each other, or different. Additionally, the functions of the amplifier unit 137 may be partially or completely incorporated into the wireless interface unit 136. For example, at least some of at least the functions of the amplifier unit 137 during transmission or the functions of the amplifier unit 137 during reception may be incorporated into the wireless interface unit 136. Likewise, at least some of at least the functions of the amplifier unit 137 during transmission or the functions of the amplifier unit 137 during reception may be constituent elements outside the communication unit 123.

The communication unit 124 has the same configuration as the communication unit 123 and performs the same processing. In other words, like the communication unit 123, the communication unit 124 includes the wireless control unit 131, the data processing unit 132, the modulation/demodulation unit 133, the signal processing unit 134, the channel estimation unit 135, the wireless interface unit 136, the amplifier unit 137, and the antenna 138 (where N is any natural number). The processing units of the communication unit 124, from the wireless control unit 131 to the antenna 138, perform the same processing as in the above-described communication unit 123.

The communication unit 123 and the communication unit 124 may be separate constituent elements, or may share some constituent elements. For example, the wireless control unit 131 may be shared by the communication unit 123 and the communication unit 124. The data processing unit 132 may be shared as well. The modulation/demodulation unit 133 may be shared as well.

As described above, the communication unit 123 and the communication unit 124 can perform wireless communication in mutually-different frequency bands. Accordingly, the base station 101 can communicate in a plurality of frequency bands using the communication unit 123 and the communication unit 124, for example. In other words, the base station 101 is capable of multiband transmission.

Note that the base station 101 may include any number of communication units, and may have three or more, for example. In other words, the base station 101 may include a communication unit aside from the communication unit 123 and the communication unit 124.

The following descriptions will assume, as an example, that the communication unit 123 performs wireless communication in a first frequency band (Band 1), and the communication unit 124 performs wireless communication in a second frequency band (Band 2).

<Configuration of Terminal Device>

The main configuration of the terminal device 102 is the same as the configuration of the base station 101 (FIG. 2). It is therefore assumed that the descriptions of FIG. 2 can be applied to the terminal device 102 as well.

<Flow of Data Transmission>

Figure 3:
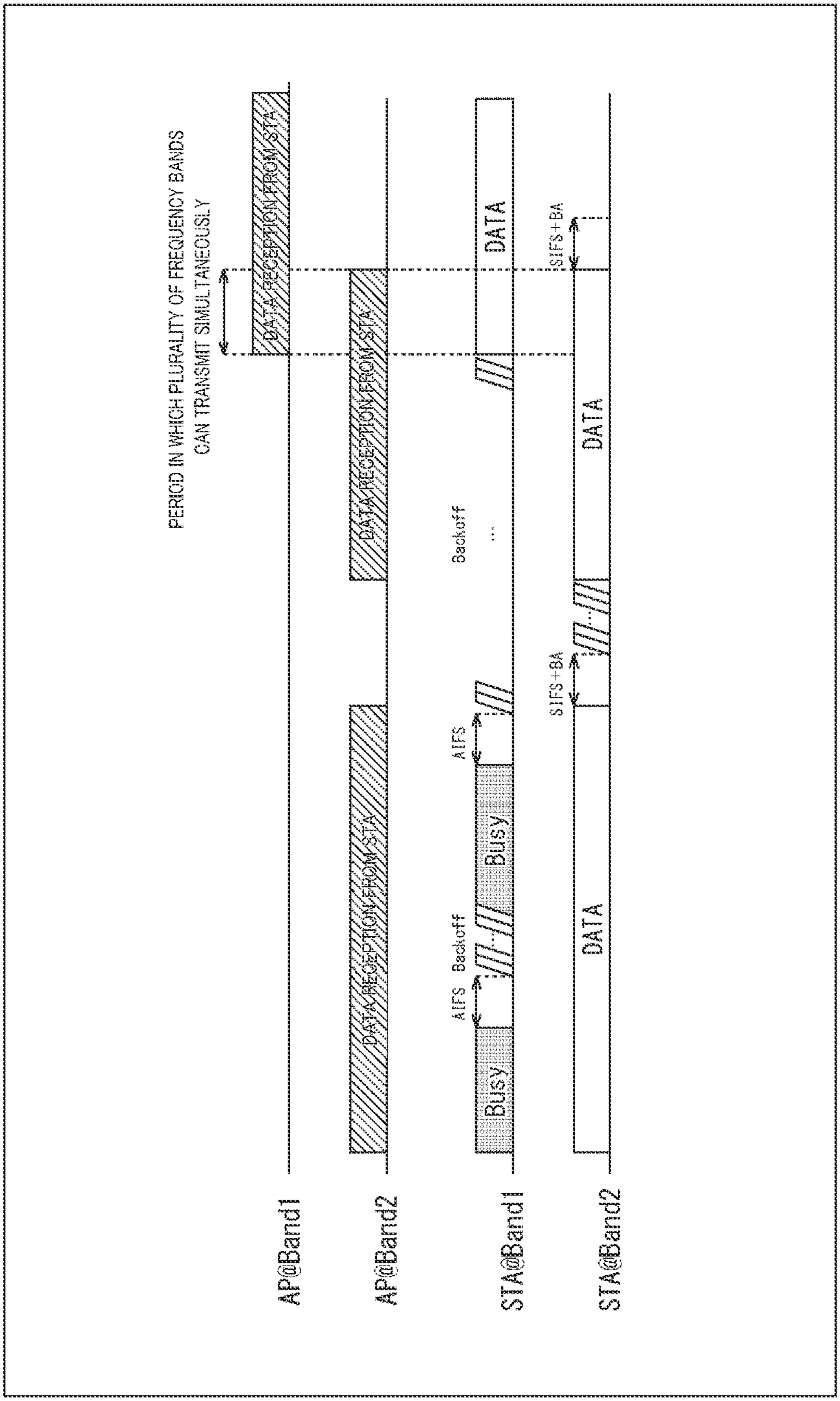
FIG. 3 is a timing chart illustrating an example of the acquisition of transmission rights independently for each of frequency bands.

Conventionally, in communication using a plurality of frequency bands, the establishment of a session (acquisition of transmission rights) is performed independently for each frequency band, as illustrated in the example in FIG. 3. The timing chart in FIG. 3 illustrates, in the top level, an example in which the base station (AP) 101 transmits data in the first frequency band (Band 1). Additionally, this timing chart illustrates, in the second level from the top, an example in which the base station (AP) 101 transmits data in the second frequency band (Band 2). Furthermore, this timing chart illustrates, in the third level from the top, an example in which the terminal device (STA) 102 transmits data in the first frequency band (Band 1). Additionally, this timing chart illustrates, in the fourth level from the top, an example in which the terminal device (STA) 102 transmits data in the second frequency band (Band 2).

In Band 1, there is a period in which the terminal device (STA) determines that communication in Band 1 is not possible (Busy) due to interference power, communication between the base station (AP) 101 and other wireless communication devices, and the like. After the end of the Busy period, the terminal device (STA) 102 attempts to acquire transmission rights after a predetermined frame transmission interval (Arbitration Inter Frame Space (AIFS)) and a random standby time (Backoff). However, if the communication fails due to communication traffic congestion or the like, the terminal device 102 will provide a longer backoff on the basis of a random number. If, during this backoff period, the transmission to the base station (AP) 101 is interrupted by another wireless communication device, the terminal device (STA) 102 will shift to the Busy state again. Accordingly, it may become difficult for the terminal device (STA) 102 to get an opportunity to communicate with the base station (AP) 101 in Band 1.

On the other hand, if no interference power, communication between the base station (AP) 101 and another wireless communication device, or the like is observed in Band 2, the terminal device (STA) 102 is likely to get an opportunity to communicate with the base station (AP) 101 in that Band 2.

In the case of the conventional method of obtaining transmission rights independently for each frequency band as illustrated in the example in FIG. 3, opportunities to execute multiband transmission may be very limited because the terminal device (STA) 102 can only perform multiband transmission using two such frequency bands after the end of the long backoff provided for Band 1. There has therefore been a risk of a drop in the efficiency of data transmission.

Accordingly, Band 2, which is available for transmission, is used to acquire transmission rights for the other frequency band, which is Band 1 (as well as for Band 2).

<Flow of Multiband Transmission Processing>

In order to perform multiband transmission, the base station 101 and the terminal device 102 of the wireless communication system 100 perform multiband transmission processing. An example of the overall flow of the multiband transmission processing will be described with reference to the flowchart in FIG. 4.

Figure 4:
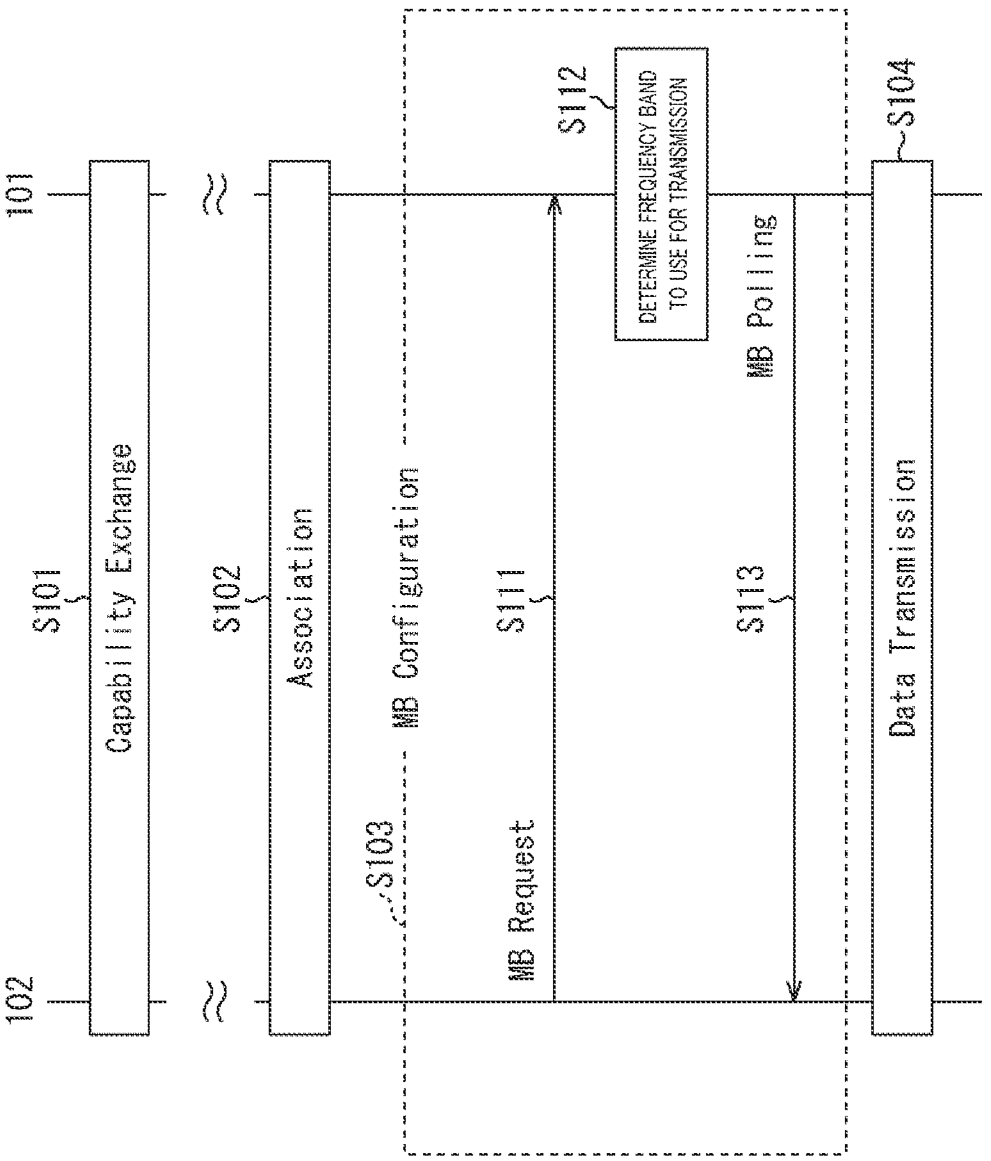
FIG. 4 is a flowchart illustrating an example of the flow of multiband transmission processing.

As illustrated in FIG. 4, the multiband transmission processing is constituted by four phases, namely Capability Exchange (step S101), Association (step S102), MB (Multi Band) Configuration (step S103), and Data Transmitting (step S104). The order in which the phases are executed is not limited to the example in FIG. 4. For example, the Capability Exchange may be performed after the Association.

In the Capability Exchange in step S101, the base station (AP) 101 and the terminal device (STA) 102 exchange information about the functions the respective devices can execute (also called "capability information"). By exchanging the capability information, the base station 101 and the terminal device 102 notify each other as to whether they are able to execute MB Configuration.

In the Association in step S102, the base station (AP) 101 and the terminal device (STA) 102 complete connection processing between the base station 101 and the terminal device 102.

In the MB Configuration in step S103, the base station (AP) 101 and the terminal device (STA) 102 determine which frequency band and which frequency bandwidth will be used for multiband transmission before the Data Transmission.

In the Data Transmission in step S104, the base station (AP) 101 and the terminal device (STA) 102 perform multiband transmission using the frequency band and frequency bandwidth determined in the MB Configuration (step S103).

In the MB Configuration of step S103 of the multiband transmission processing described above, the terminal device 102 transmits an MB Request (also called "MB Req"), which is a control signal for performing wireless communication in the first frequency band, in the second frequency band in which transmission is possible, and the base station 101 receives the MB Request (step S111). Then, in the case of the present embodiment, the base station (AP) 101 serves as the main entity that determines the frequency band and frequency bandwidth to be used during multiband transmission (step S112). After determining the frequency band and frequency bandwidth to be used for multiband transmission on the basis of the MB Request, the base station 101 transmits an MB Polling (also called "MB Poll"), which is a response signal to the MB Request, to the terminal device 102, and the terminal device 102 receives the MB Polling (step S113). By exchanging this MB Polling, the frequency band and frequency bandwidth determined by the base station 101 are communicated to the terminal device 102. The base station 101 and the terminal device 102 can therefore perform multiband transmission with the determined frequency band and frequency bandwidth in the Data Transmission (step S104).

<Capability Frame>

Figure 5:
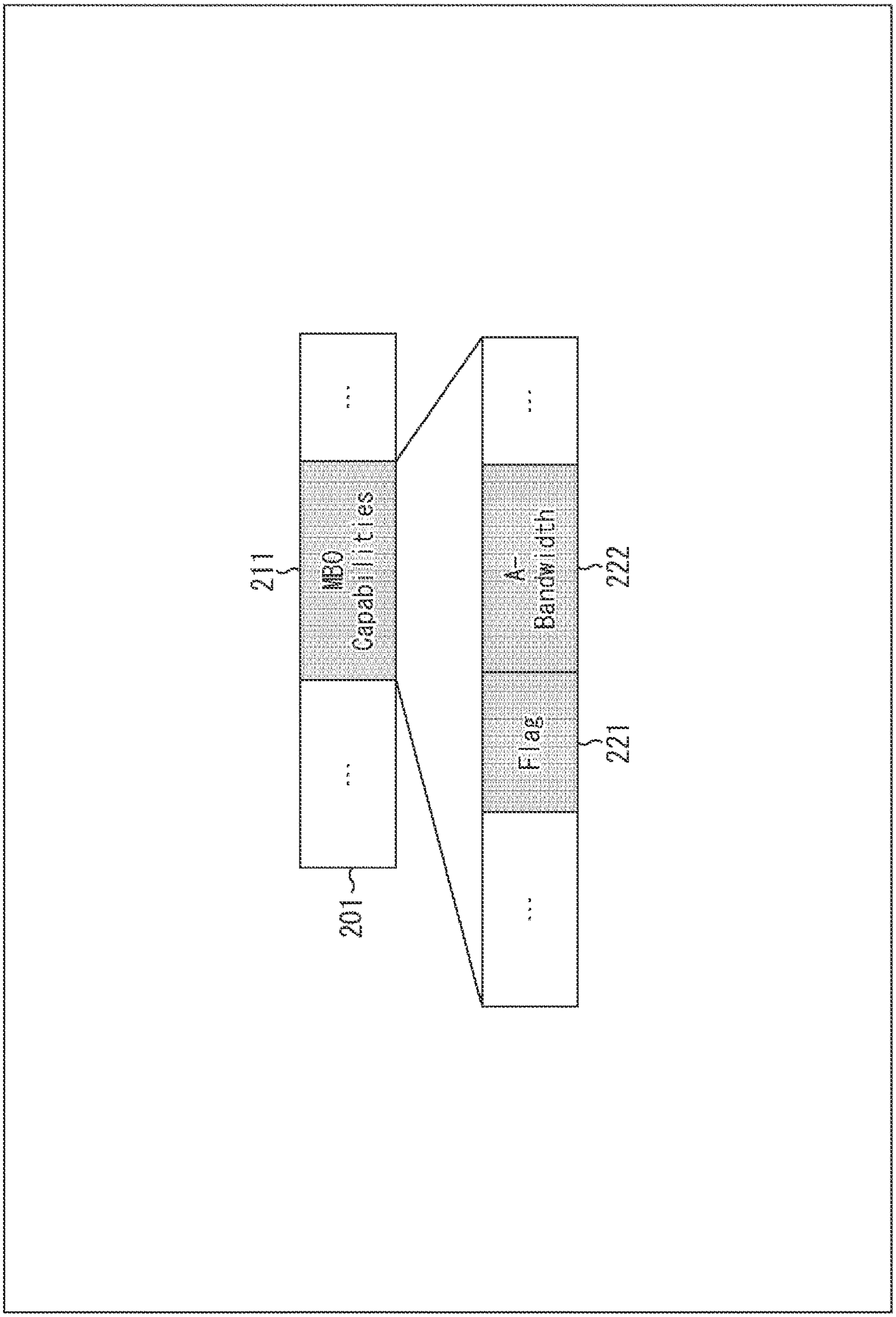
FIG. 5 is a diagram illustrating an example of the main configuration of a capability frame.

In the Capability Exchange (step S101), the base station 101 and the terminal device 102 exchange capability information with each other. FIG. 5 illustrates an example of the main configuration of a frame of this capability information (also called a "capability frame").

As illustrated in FIG. 5, a capability frame 201 includes, for example, MBO (Multi Band Operation) Capabilities 211, which indicates performance related to multiband transmission. This MBO Capabilities 211 includes, for example, a Flag 221 and A-Bandwidth 222.

The Flag 221 holds flag information indicating whether or not the wireless communication device that transmitted the capability frame 201 (e.g., the base station 101, the terminal device 102, or the like) is capable of executing the MB Configuration. If the Flag 221 indicates that the MB Configuration can be executed, the Flag 221 may also include information related to other information in the MBO Capabilities 211. For example, information indicating how many bits the A-Bandwidth 222 is expressed with may be included in the Flag 221.

The A-Bandwidth 222 includes information indicating the frequency band and frequency bandwidth that the wireless communication device which transmitted the capability frame 201 (e.g., the base station 101, the terminal device 102, or the like) can use during multiband transmission (i.e., information pertaining to candidates for the frequency band and frequency bandwidth). Note that if the Flag 221 includes information indicating that the MB Configuration cannot be executed, the A-Bandwidth 222 may be omitted.

<MB Configuration>

Figure 6:
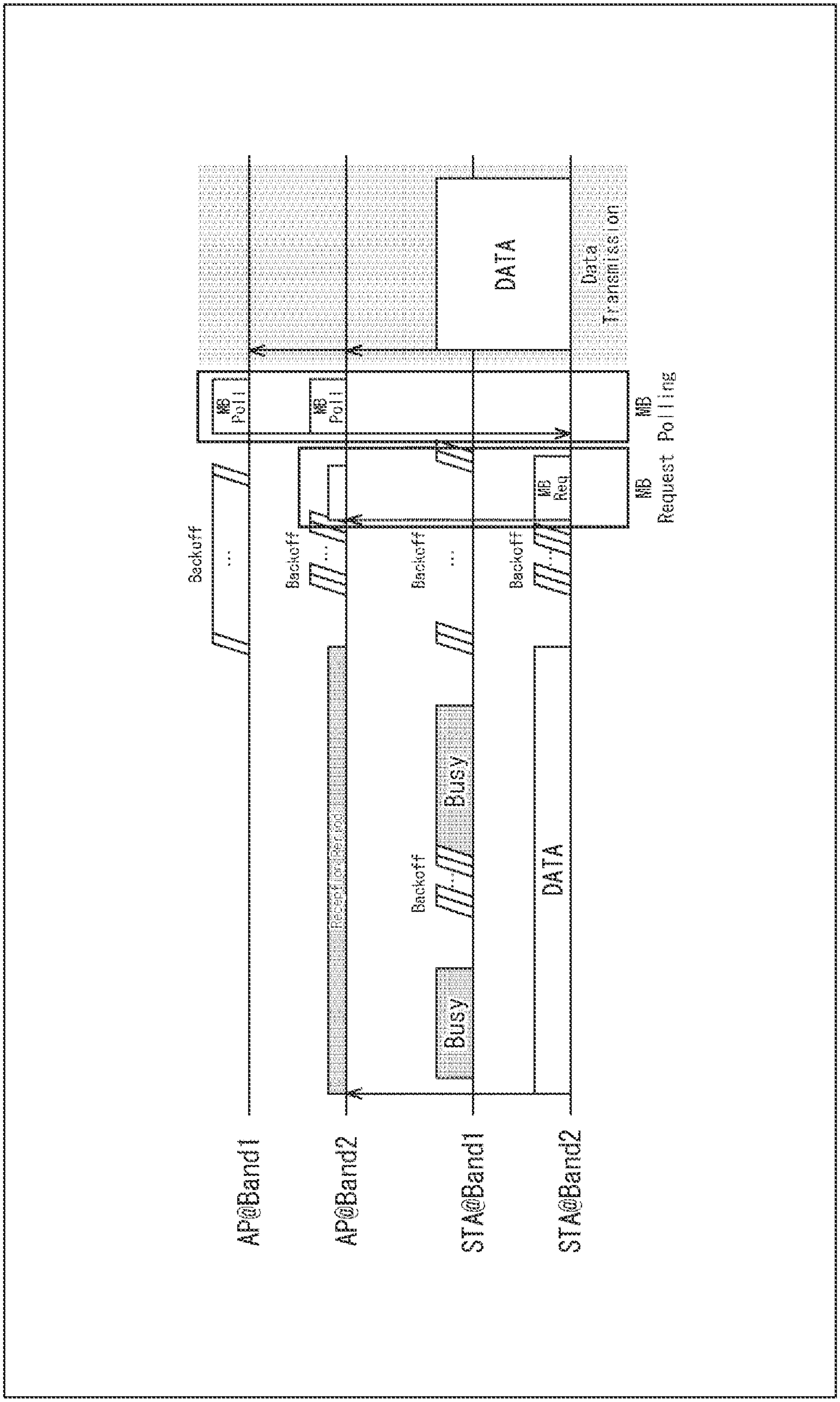
FIG. 6 is a timing chart illustrating an example of multiband transmission being performed.

A sequence of the MB Configuration (step S103) will be described next. FIG. 6 is a timing chart illustrating an example of the MB Configuration performed during multiband transmission.

In the example illustrated in FIG. 6, in a state in which transmission is possible, where the backoff in the second frequency band (Band 2) has ended and transmission rights have been acquired, and where the first frequency band (Band 1) is in a state which does not correspond to data being transmitted or Busy (an Idle state), the terminal device (STA) 102 transmits an MB Request (MB Req) in the second frequency band (Band 2).

The MB Req is a control signal for wireless communication in the second frequency band, in which the terminal device (STA) 102 is capable of transmitting the MB Req in the Data Transmission, and the first frequency band (a control signal requesting the implementation of wireless communication in another frequency band). For example, this MB Req is transmitted to perform transmission in the first frequency band which is in an Idle state.

For example, the MB Req is transmitted to implement multiband transmission (synchronized transmission in at least two or more frequency bands among a plurality of frequency bands including the first frequency band and the second frequency band) (to request the implementation of multiband transmission). This MB Req includes, for example, information requesting a notification of the frequency band and frequency bandwidth that can be used for the multiband transmission. Note that this MB Req may include information indicating the frequency band and frequency bandwidth that the terminal device (STA) 102 uses preferentially. This MB Req may also include information about a period during which the base station 101 and the terminal device 102 communicate in at least one frequency band, and a period during which a third device that receives this MB Req suppresses transmission. The terminal device 102 transmits this MB Req to the base station 101 using Band 2, in which transmission is possible. Multiband transmission is a data transmission that uses a plurality of frequency bands, as described above.

When the MB Req is received, the base station 101 transmits the MB Polling (MB Poll) as a response signal in Band 1 and Band 2. This MB Poll includes, for example, information indicating the frequency band and frequency bandwidth used by the terminal device (STA) 102 for multiband transmission in the Data Transmission. This MB Poll may also include information about a period during which the base station 101 and the terminal device 102 communicate in at least one frequency band, and a period during which a third device that receives this MB Req suppresses transmission. Note that the information about the period may be information recalculated from the information about the period communicated by the MB Req.

Note also that this MB Poll can be transmitted in any frequency band. For example, the base station 101 may transmit the MB Poll in all or some of the frequency bands in which the base station 101 is capable of transmission. Additionally, for example, the base station 101 may transmit the MB Poll in all or some of the frequency bands in which the terminal device 102 is capable of reception, which are known from the exchange of the capability information. Furthermore, for example, the base station 101 may transmit the MB Poll in all or some of the frequency bands that the terminal device 102 can use for multiband transmission, indicated by the MB Req. Additionally, for example, the base station 101 may transmit the MB Poll in all or some of the frequency bands that the terminal device 102 uses preferentially, indicated by the MB Req. Furthermore, for example, the base station 101 may transmit the MB Poll in all or some of the frequency bands determined to be used in the multiband transmission.

In other words, the base station 101 may transmit the MB Poll in a single frequency band, or may transmit the MB Poll in a plurality of frequency bands. By having the base station 101 transmit the MB Poll in a plurality of frequency bands, the terminal device 102 can more reliably receive the MB Poll transmitted by the base station 101.

In the Data Transmission, the terminal device 102 and the base station 101 perform multiband transmission using the frequency band and frequency bandwidth specified by this MB Poll, i.e., the frequency band and frequency bandwidth determined by the base station 101.

However, if the MB Poll indicates that multiband transmission is not possible, the terminal device 102 and the base station 101 may perform wireless communication in a single frequency band without performing multiband transmission.

Note that in the example in FIG. 6, the terminal device (STA) 102 is illustrated as transmitting the MB Request using Band 2, but the configuration is not limited thereto, and the terminal device 102 can also transmit the MB Request using Band 1. For example, if the transmission rights can be acquired in Band 1 before Band 2, the terminal device 102 may use Band 1 to transmit the MB Request. Additionally, for example, if the transmission rights have been successfully acquired simultaneously in both Band 1 and Band 2, the terminal device 102 may transmit the MB Request using both Band 1 and Band 2, or the transmission of the MB Request (i.e., MB Configuration) may be omitted (with the Data Transmission being performed without the MB Configuration).

Although the example of FIG. 6 illustrates a case where two frequency bands, Band 1 and Band 2, are used for multiband transmission, the configuration is not limited thereto, and three or more frequency bands may be used for this multiband transmission.

<MB Req Frame>

Figure 7:
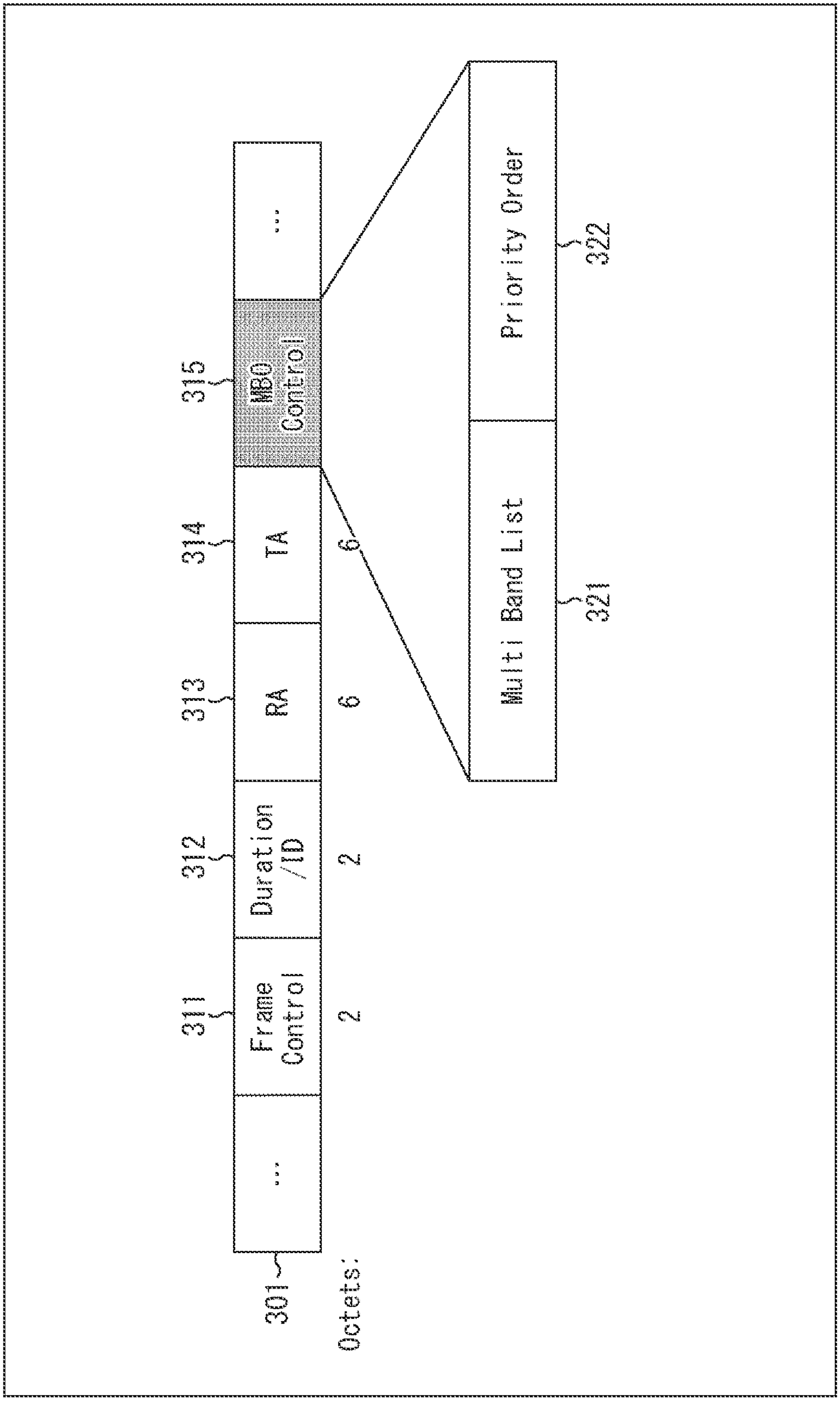
FIG. 7 is a diagram illustrating an example of the main configuration of an MB Req frame.

The configuration of the frame of the above-described MB Req will be described next. FIG. 7 is a diagram illustrating an example of the main configuration of the MB Req frame. As illustrated in FIG. 7, an MB Req frame 301 includes, for example, Frame Control 311, Duration/ID 312, RA 313, TA 314, and MBO Control 315.

Frame Control 311 includes information indicating that the frame is an MB Request. Note that Frame Control 311 may include information indicating that MBO Control 315 is present in the frame. In other words, MBO Control 315 can be omitted. Frame Control 311 may also include information indicating the length of MBO Control 315.

Duration/ID 312 includes information indicating the length of the frame. RA 313 includes information indicating that the frame is intended to be received by the base station (AP) 101. This information includes, for example, a MAC (Media Access Control) address indicating the base station (AP) 101. TA 314 includes information indicating that the frame was transmitted by the terminal device (STA) 102. This information includes, for example, a MAC address indicating the terminal device (STA) 102.

MBO Control 315 is the control information pertaining to multiband transmission. This MBO Control 315 can include information indicating candidates for the frequency bands and frequency bandwidths to be used in the multiband transmissions, the priorities thereof, and the like. For example, this MBO Control 315 includes Multi Band List 321 and Priority Order 322.

Multi Band List 321 includes information indicating the frequency bands and frequency bandwidths that the terminal device (STA) 102 can use for multiband transmission (i.e., candidates for the frequency bands and frequency bandwidths to be used for multiband transmission). This Multi Band List 321 may include information indicating the frequency band and frequency bandwidth that the terminal device (STA) 102 will preferentially use for multiband transmission.

Priority Order 322 includes information pertaining to the priority of the candidates for the frequency bands and frequency bandwidths indicated in Multi Band List 321. For example, Priority Order 322 may include information indicating a priority order of the candidates for the frequency bands and frequency bandwidths, indicated in Multi Band List 321, that the terminal device (STA) 102 will use for multiband transmission in the Data Transmission.

Note that Multi Band List 321 and Priority Order 322 do not have to be stored in the order indicated in FIG. 7. For example, if information indicating a plurality of frequency bands and frequency bandwidths can be stored in Multi Band List 321, information indicating a priority order of the information may be stored immediately after the information indicating each frequency band and frequency bandwidth.

<MB Poll Frame>

Figure 8:
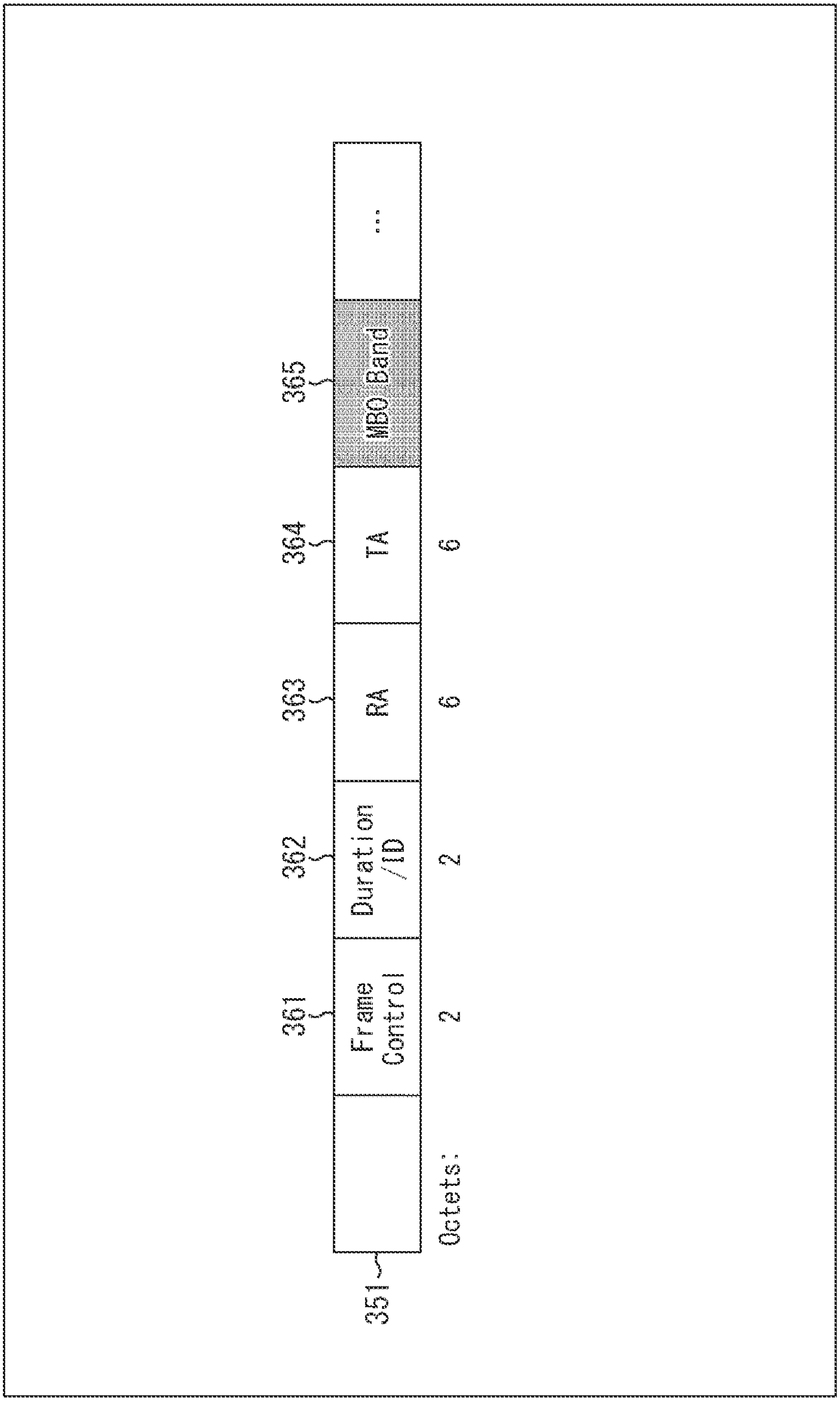
FIG. 8 is a diagram illustrating an example of the main configuration of an MB Poll frame.

The configuration of the frame of above-described MB Poll will be described next. FIG. 8 is a diagram illustrating an example of the main configuration of the MB Poll frame. As illustrated in FIG. 8, an MB Poll frame 351 includes, for example, Frame Control 361, Duration/ID 362, RA 363, TA 364, and MBO Band 365.

Frame Control 361, Duration/ID 362, RA 363, and TA 364 are the same as Frame Control 311, Duration/ID 312, RA 313, and TA 314, respectively, of the MB Req frame.

For example, Frame Control 361 includes information indicating that the frame is an MB Poll. Note that Frame Control 361 may include information indicating that MBO Band 365 is present in the frame. Frame Control 361 may also include information indicating the length of MBO Band 365.

Duration/ID 362 includes information indicating the length of the frame. RA 363 includes information indicating that the frame is intended to be received by the terminal device (STA) 102. This information includes, for example, a MAC address indicating the terminal device (STA) 102. TA 364 includes information indicating that the frame was transmitted by the base station (AP) 101. This information includes, for example, a MAC address indicating the base station (AP) 101.

MBO Band 365 includes information indicating the frequency band and frequency bandwidth to be used for multiband transmission in the Data Transmission, which has been determined by the base station 101. Note that if multiband transmission is not possible, this MBO Band 365 may include information indicating that multiband transmission is not possible.

<MB Configuration Processing by Terminal Device>

In the MB Configuration (step S103), the terminal device (STA) 102 executes the MB configuration processing and performs the above-described processing. An example of the flow of the MB configuration processing by the terminal device 102 will be described with reference to the flowchart in FIG. 9.

When the MB configuration processing is started, in step S201, the control unit 121 of the terminal device 102 refers to the capability information of the base station (AP) 101 obtained in the Capability Exchange (step S101) phase, and determines whether or not MB Configuration is indicated as being possible by Flag 221 of MBO Capabilities 211 in the capability frame 201.

If the information indicating that the base station 101 can execute the MB configuration is included in the Flag 221, and it is determined that the base station 101 is capable of executing the MB Configuration, the processing moves to step S202.

In step S202, the control unit 121 determines whether or not there is a frequency band in which the backoff has ended. If it is determined that there is no such frequency band, the processing moves to step S203.

In step S203, the control unit 121 stands by until the backoff ends. When the processing of step S203 ends, the processing moves to step S204. If it is determined in step S202 that there is a frequency band in which the backoff has ended, the processing of step S203 is skipped, and the processing moves to step S204.

In step S204, the control unit 121 determines whether or not a plurality of frequency bands among the frequency bands in which the terminal device 102 is capable of multiband transmission are idle. The Idle state is a state that is neither a state in which data transmission is underway, nor a busy state. For example, a state in which no data transmission is being performed, between the busy state and a state in which data transmission is underway, is also called an Idle state. In other words, when the backoff ends in one of the frequency bands, the control unit 121 determines whether there is another frequency band that is in the Idle state.

Any method can be used to determine whether or not the state is the Idle state. For example, the state may be determined to be the Idle state when none of the following three conditions ((1) to (3)) are met.

(1) The wireless signal of the wireless communication system 100 is detected at a power greater than or equal to a first threshold.

(2) Some wireless signal, without being limited to the wireless communication system 100, is detected at a power greater than or equal to a second threshold.

(3) The wireless signal of the wireless communication system 100 is detected at a power greater than or equal to a third threshold during a set period up to the point in time when the base station 101 receives the MB Request. (However, this "set period" is assumed to include one or more wireless signal cycles. Additionally, the "third threshold" may also be defined for each frequency band and frequency bandwidth).

If it is determined that a plurality of frequency bands are in the Idle state, i.e., when the backoff ends for one of the frequency bands, there is another frequency band in the Idle state, the processing moves to step S205.

In step S205, the control unit 121 controls the communication unit 123 or the communication unit 124 to acquire transmission rights in the frequency band in which the backoff has ended (Band 2, in the case of the example in FIG. 6), and to transmit the MB Request for multiband transmission to the base station 101 using that frequency band (Band 2, in the case of the example in FIG. 6). In other words, the control unit 121 causes the control signal for wireless communication in the first frequency band to be transmitted in the second frequency band, which is capable of transmission.

The MB Polling is transmitted from the base station 101 as a response signal to the MB Request transmitted in this manner. The communication unit 123, the communication unit 124, or both receive this MB Polling. In step S206, the control unit 121 determines whether or not the communication unit 123, the communication unit 124, or both have received the MB Polling in any of the frequency bands from the base station 101.

The processing moves to step S207 if it is determined that the MB Polling has not been received in any of the frequency bands. In step S207, the control unit 121 determines whether or not to make a retransmission request for the MB Polling. The processing moves to step S208 when it is determined to make a retransmission request. In step S208, the control unit 121 controls the communication unit 123, the communication unit 124, or both to request the base station 101 to retransmit the MB Polling. Once the processing of step S208 ends, the processing returns to step S206, and the processing following thereafter is repeated. This retransmission request is repeated a predetermined number of times or for a predetermined period if no MB Polling is received.

Then, in step S206, if it is determined that the MB Polling has been received in any of the frequency bands, the processing moves to step S209.

In step S209, the control unit 121 refers to the MB Polling received by the communication unit 123, the communication unit 124, or both, and sets the frequency band/frequency bandwidth indicated in MBO Band 365 of MB Poll frame 351 thereof (the frequency band/frequency bandwidth determined by the base station 101) as the frequency band/frequency bandwidth to be used for multiband transmission.

As described above, by setting the frequency band/frequency bandwidth to be used for multiband transmission, the MB configuration processing ends and transitions to the Data Transmission phase. In this case, multiband transmission is performed in the Data Transmission.

Note that when the received MB Polling indicates that multiband transmission is not possible, the processing of step S210, described later, may be executed instead of the above-described processing of step S209.

Additionally, in step S201, if the information indicating that the base station 101 cannot execute the MB configuration is included in the Flag 221, and it is determined that the base station 101 is capable of executing the MB Configuration, the processing moves to step S210. Additionally, in step S204, if it is determined that the plurality of frequency bands are not in the Idle state and multiband transmission cannot be performed, the processing moves to step S210. Additionally, in step S207, if the MB Polling retransmission request is repeated a predetermined number of times or for a predetermined period and it is determined that no further MB Polling retransmission requests are to be made, the processing moves to step S210.

In other words, in these cases, the control unit 121 gives up on the multiband transmission, and transmits the data using a single frequency band in which data can be transmitted (also called "single-band transmission"). In other words, in step S210, the control unit 121 controls the communication unit 123 or the communication unit 124, and sets the frequency band/frequency bandwidth for which the backoff has ended as the frequency band/frequency bandwidth to be used for data transmission (single-band transmission). In other words, in this case, the control unit 121 obtains the transmission rights independently for each frequency band.

Once the processing of step S210 ends, the MB configuration processing ends and transitions to the Data Transmission phase. In this case, single-band transmission is performed in the Data Transmission.

Although the foregoing describes the control unit 121 as performing the MB configuration processing, the configuration is not limited thereto, and any of the wireless control units 131 may perform the MB configuration processing, a plurality of the wireless control units 131 may perform the MB configuration processing cooperatively, or the control unit 121 and the wireless control unit 131 may perform the MB configuration processing cooperatively.

<MB Configuration Processing by Base Station>

In the MB Configuration (step S103), the base station (AP) 101 executes the MB configuration processing and performs the above-described processing in response to the MB configuration processing by the terminal device (STA) 102 described above. An example of the flow of the MB configuration processing by the base station 101 will be described with reference to the flowchart in FIG. 10.

When the MB configuration processing is started, in step S251, the control unit 121 of the base station 101 controls the communication unit 123 or the communication unit 124 and receives the MB Request, transmitted from the terminal device 102, in any of the frequency bands in which reception is possible.

In step S252, the control unit 121 determines whether or not there is a frequency band in the Idle state aside from the frequency band in which the MB Request was received. Any method can be used to determine whether or not the state is the Idle state. For example, the state may be determined to be the Idle state when none of the three conditions ((1) to (3)) described above in <MB Configuration Processing by Terminal Device> are met. When it is determined that there is a frequency band in the Idle state, the processing moves to step S253.

In step S253, the control unit 121 determines the frequency band/frequency bandwidth to be used for multiband transmission, and stores information indicating the determined frequency band/frequency bandwidth in MBO Band 365 of the MB Poll frame 351. In other words, the control unit 121 determines a frequency band/frequency bandwidth which the control unit 121 itself can use for multiband transmission, from among the candidates for the frequency band/frequency bandwidth indicated in the received MB Request (frequency bands/frequency bandwidths which the terminal device 102 can use for multiband transmission), as the frequency band/frequency bandwidth to be used for the multiband transmission.

Note that when there are a plurality of frequency bands/frequency bandwidths which the base station 101 and the terminal device 102 can use for the multiband transmission, the control unit 121 may determine the frequency band/frequency bandwidth to be used for the multiband transmission on the basis of the priority (priority order) indicated by the MB Request, for example. The processing moves to step S255 when the MB Polling is generated as described above.

Additionally, in step S252, if it is determined that there is no other frequency band in the Idle state, the processing moves to step S254. In step S254, the control unit 121 determines to transmit data in the frequency band in which the MB Request was received, and stores that information in MBO Band 365 of the MB Poll frame 351. In other words, the control unit 121 determines not to perform multiband transmission, and stores information indicating that data is to be transmitted in the frequency band in which the MB Request was received (or information indicating that multiband transmission is not possible) in MBO Band 365 of the MB Poll frame 351. The processing moves to step S255 when the MB Polling is generated as described above.

In step S255, the control unit 121 controls the communication unit 123, the communication unit 124, or both to transmit the MB Polling generated in step S253 or step S254 to the terminal device 102 as a response signal to the MB Request. As described above with reference to FIG. 6, this MB Polling can be transmitted in any frequency band.

Once the MB Polling is transmitted in this manner, the MB configuration processing ends and transitions to the Data Transmission phase. In this case, multiband transmission or single-band transmission is performed in the Data Transmission. For example, if the MB Polling has been generated through the processing of step S253, multiband transmission is performed in the Data Transmission. Alternatively, if the MB Polling has been generated through the processing of step S254, single-band transmission is performed in the Data Transmission.

<Effects>

As described above, the terminal device 102, which can perform multiband transmission, uses the MB Request to notify the base station 101 of transmission in two or more frequency bands, using the band through which the transmission rights were acquired first. Through this, the base station 101 can determine the frequency band to be used for the multiband transmission on the basis of that MB Request, and notify the terminal device 102 thereof as the MB Polling. Accordingly, the terminal device 102 can shift a frequency band which is in an Idle state (a standby state) to a state in which transmission is possible immediately on the basis of the MB Polling transmitted from the base station 101. This makes it possible for the terminal device 102 to suppress an increase in the transmission standby time caused by multiband transmission.

Additionally, by shortening this transmission standby time, the terminal device 102 can suppress a drop in the opportunities to acquire the transmission rights for multiband transmission in a random access scheme. Furthermore, by transmitting the MB Request using the frequency band for which transmission rights have already been acquired, the terminal device 102 can suppress the occurrence of collisions caused by transmitting the MB Request. Additionally, by transmitting the MB Poll, the terminal device 102 can suppress the occurrence of collisions caused by other communication when receiving data, even if the backoff time is reduced. Accordingly, a drop in the efficiency of frequency band usage by wireless communication can be suppressed (or more typically, the efficiency of usage can be improved) for the entire wireless communication system 100.

Note that when the base station 101 transmits the same MB Polling in a plurality of frequency bands, a diversity effect in those frequency bands can be obtained. This makes it possible to suppress a drop in the probability that the terminal device 102 will receive that MB Polling (or more typically, improve that probability).

2. Second Embodiment

<Determination of Frequency Bands by Terminal Device>

Although the first embodiment described the base station (AP) 101 as being the main entity that determines the frequency band and frequency bandwidth used in the multiband transmission, the configuration is not limited thereto, and the terminal device (STA) 102 may be the main entity that determines the frequency band and the frequency bandwidth used in the multiband transmission.

Figure 11:
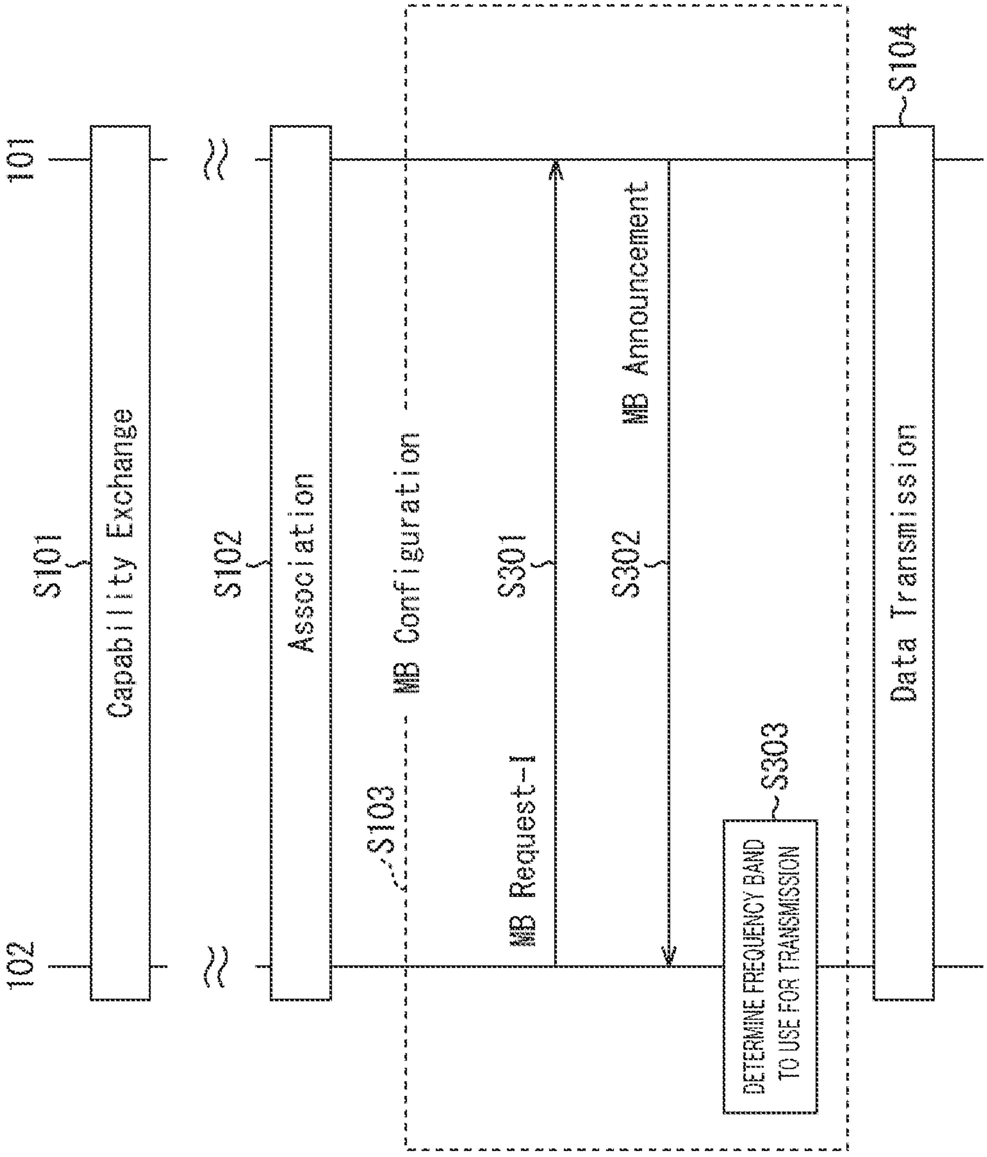
FIG. 11 is a flowchart illustrating another example of the flow of multiband transmission processing.

An example of the overall flow of the multiband transmission processing in this case will be described with reference to the flowchart in FIG. 11. In this case too, the multiband transmission processing is constituted by four phases, namely Capability Exchange (step S101), Association (step S102), MB (Multi Band) Configuration (step S103), and Data Transmitting (step S104).

However, in the present embodiment, the terminal device 102 serves as the main entity that determines the frequency band and frequency bandwidth to be used in the multiband transmission in the MB Configuration of step S103.

For example, using a frequency band in which transmission is possible, the terminal device 102 transmits an MB Request-I (also called "MB Req-I"), which is a control signal for performing wireless communication in another frequency band, and the base station 101 receives that MB Request-I (step S301). Then, in the present embodiment, the base station 101 transmits an MB Announcement (also called "MB Info") as a response signal to the MB Request-I, and the terminal device 102 receives that MB Announcement (step S302). The MB Announcement includes information indicates candidates for the frequency band and frequency bandwidth that can be used during multiband transmission.

The terminal device 102 determines the frequency band and frequency bandwidth to be used during multiband transmission on the basis of that MB Announcement (step S303). In other words, the terminal device 102 selects the frequency band and frequency bandwidth to be used during multiband transmission from among the candidates included in that MB Announcement.

The base station 101 and the terminal device 102 perform multiband transmission with the determined frequency band and frequency bandwidth in the Data Transmission (step S104).

<Capability Frame>

Figure 12:
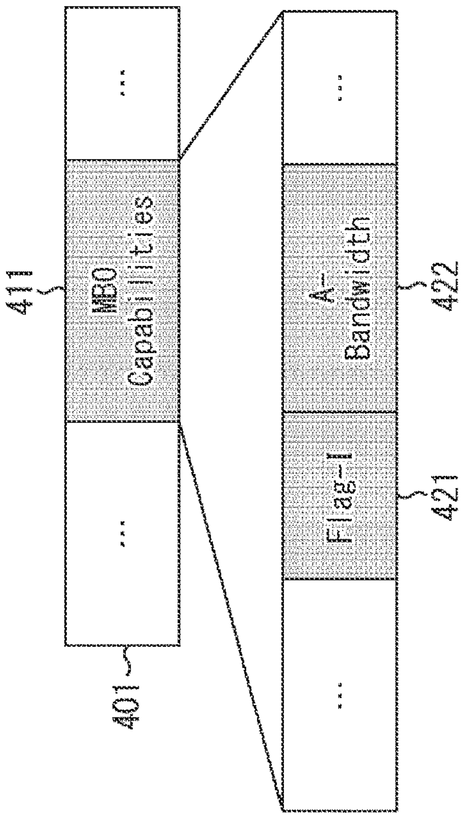
FIG. 12 is a diagram illustrating another example of the configuration of a capability frame.

FIG. 12 illustrates an example of the main configuration of the frame of the capability information exchanged between the base station 101 and the terminal device 102 in the Capability Exchange (step S101) in the present embodiment.

In the present embodiment, a capability frame 401 includes, for example, MBO (Multi Band Operation) Capabilities 411, which indicates performance related to multiband transmission. This MBO Capabilities 411 includes, for example, a Flag-I 421 and A-Bandwidth 422.

Like the Flag 221, the Flag-I 421 holds flag information indicating whether or not the wireless communication device that transmitted the capability frame 401 (e.g., the base station 101, the terminal device 102, or the like) is capable of executing the MB Configuration. If the Flag-I 421 indicates that the MB Configuration can be executed, the Flag-I 421 may also include information related to other information in the MBO Capabilities 411. For example, information indicating how many bits the A-Bandwidth 422 is expressed with may be included in the Flag-I 421.

Like the A-Bandwidth 222, the A-Bandwidth 422 includes information indicating the frequency band and frequency bandwidth that the wireless communication device which transmitted the capability frame 401 (e.g., the base station 101, the terminal device 102, or the like) can use during multiband transmission (i.e., information pertaining to candidates for the frequency band and frequency bandwidth). Note that if the Flag-I 421 includes information indicating that the MB Configuration cannot be executed, the A-Bandwidth 422 may be omitted.

<MB Configuration>

Figure 13:
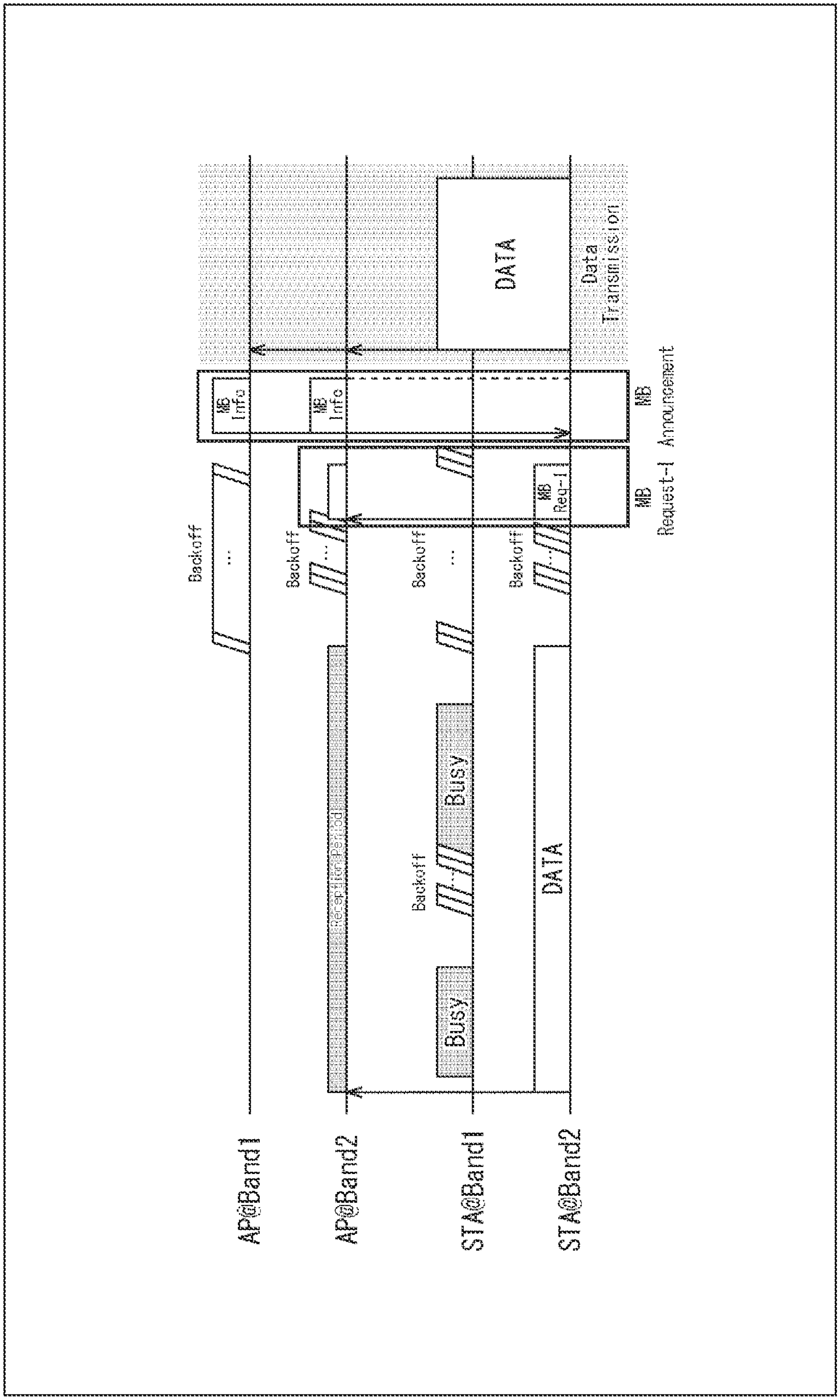
FIG. 13 is a timing chart illustrating another example of multiband transmission being performed.

A sequence of the MB Configuration (step S103) will be described next. FIG. 13 is a timing chart illustrating an example of the MB Configuration performed during multiband transmission in the present embodiment.

As in the first embodiment, in the example illustrated in FIG. 13, in a state where the backoff in the second frequency band (Band 2) has ended and transmission rights have been successfully acquired, and where the first frequency band (Band 1) is in a state which does not correspond to data being transmitted or Busy (an Idle state), the terminal device (STA) 102 transmits the MB Request-I (MB Req-I) in Band 2.

The MB Req-I is a control signal for the terminal device (STA) 102 to perform wireless communication, in the Data Transmission, in another frequency band aside from the frequency band in which the MB Req-I can be sent (a control signal requesting wireless communication in the other frequency band). For example, this MB Req-I is transmitted to perform transmission in another frequency band which is in an Idle state.

For example, the MB Req-I is transmitted in order to perform multiband transmission (synchronized transmission in a plurality of frequency bands) (i.e., is transmitted to request multiband transmission). In other words, the MB Req-I is a control signal requesting that the terminal device 102 transmit the MB Info, which is a response signal thereto.

Note that this MB Req-I may include reference information for narrowing the range of information communicated through the MB Info. For example, information indicating a range of candidates for the frequency band and frequency bandwidth to be used in multiband transmission (or more candidates) may be included. For example, the MB Req-I may include information indicating a frequency band and frequency bandwidth the terminal device 102 can use for multiband transmission. Additionally, for example, information indicating the frequency band and frequency bandwidth that the terminal device 102 uses preferentially (information indicating priority) may be included. In addition, this MB Req-I may also include information about a period during which the base station 101 and the terminal device 102 communicate in at least one frequency band, and a period during which a third device that receives this MB Req-I suppresses transmission.

When the MB Req-I is received, the base station 101 transmits the MB Announcement (MB Info) to the terminal device 102 as a response signal in Band 1 and Band 2. This MB Info includes information indicating the frequency band and frequency bandwidth determined to be usable for multiband transmission in the Data Transmission by the base station 101 at the point in time when the MB Req-I was received, for example. This MB Info may also include information about a period during which the base station 101 and the terminal device 102 communicate in at least one frequency band, and a period during which a third device that receives this MB Req suppresses transmission. Note that the information about the period may be information recalculated from the information about the period communicated by the MB Req-I.

In other words, upon receiving the MB Req-I, the base station 101 sets candidates for the frequency band and frequency bandwidth to be used in the multiband transmission, generates the MB Info including information indicating the set candidates, and transmits the MB Info to the terminal device 102, for example. At this time, the base station 101 may select a frequency band and frequency bandwidth the base station 101 can use for multiband transmission from the information included in the MB Req-I (e.g., the frequency bands and frequency bandwidths the terminal device 102 can use for multiband transmission), and set the selected frequency band and frequency bandwidth as the candidates for the frequency band and frequency bandwidth to be used for multiband transmission. Doing so makes it possible for the base station 101 to take a frequency band and frequency bandwidth usable by both the base station 101 and the terminal device 102 as the candidates. Additionally, for example, the base station 101 may set the above-described candidates on the basis of information, included in the MB Req-I, indicating a frequency band and frequency bandwidth used preferentially by the terminal device 102. Doing so makes it possible for the base station 101 to set the above-described candidates in consideration of the priorities of the frequency band and frequency bandwidth.

Note also that this MB Info can be transmitted in any frequency band. For example, the base station 101 may transmit the MB Info in all or some of the frequency bands in which the base station 101 is capable of transmission. Additionally, for example, the base station 101 may transmit the MB Info in all or some of the frequency bands in which the terminal device 102 is capable of reception, which are known from the exchange of the capability information. Furthermore, for example, the base station 101 may transmit the MB Info in all or some of the frequency bands that the terminal device 102 can use for multiband transmission, indicated by the MB Req-I. Additionally, for example, the base station 101 may transmit the MB Info in all or some of the frequency bands that the terminal device 102 uses preferentially, indicated by the MB Req-I. Furthermore, for example, the base station 101 may transmit the MB Info in all or some of the candidate frequency bands which have been set.

In other words, the base station 101 may transmit the MB Info in a single frequency band, or may transmit the MB Info in a plurality of frequency bands. By having the base station 101 transmit the MB Info in a plurality of frequency bands, the terminal device 102 can more reliably receive the MB Info transmitted by the base station 101.

Upon receiving the MB Info, the terminal device 102 determines the frequency band and frequency bandwidth to be used for multiband transmission on the basis of the information included in the MB Info. For example, the terminal device 102 selects the frequency band and frequency bandwidth to be used for multiband transmission from among the candidates specified by the MB Info.

The terminal device 102 and the base station 101 perform multiband transmission using the frequency band and frequency bandwidth determined by the terminal device 102 in the Data Transmission.

However, if the MB Info indicates that multiband transmission is not possible, the terminal device 102 and the base station 101 may perform wireless communication in a single frequency band without performing multiband transmission.

Like the first embodiment, in the present embodiment, the terminal device 102 can also transmit the MB Request-I using Band 1. For example, if the transmission rights can be acquired in Band 1 before Band 2, the terminal device 102 may use Band 1 to transmit the MB Request-I. Additionally, for example, if the transmission rights have been successfully acquired simultaneously in both Band 1 and Band 2, the terminal device 102 may transmit the MB Request-I using both Band 1 and Band 2, or the transmission of the MB Request-I (i.e., MB Configuration) may be omitted (with the Data Transmission being performed without the MB Configuration).

Additionally, like the first embodiment, in the present embodiment, three or more frequency bands may be used for this multiband transmission.

<MB Req-I Frame>

Figure 14:
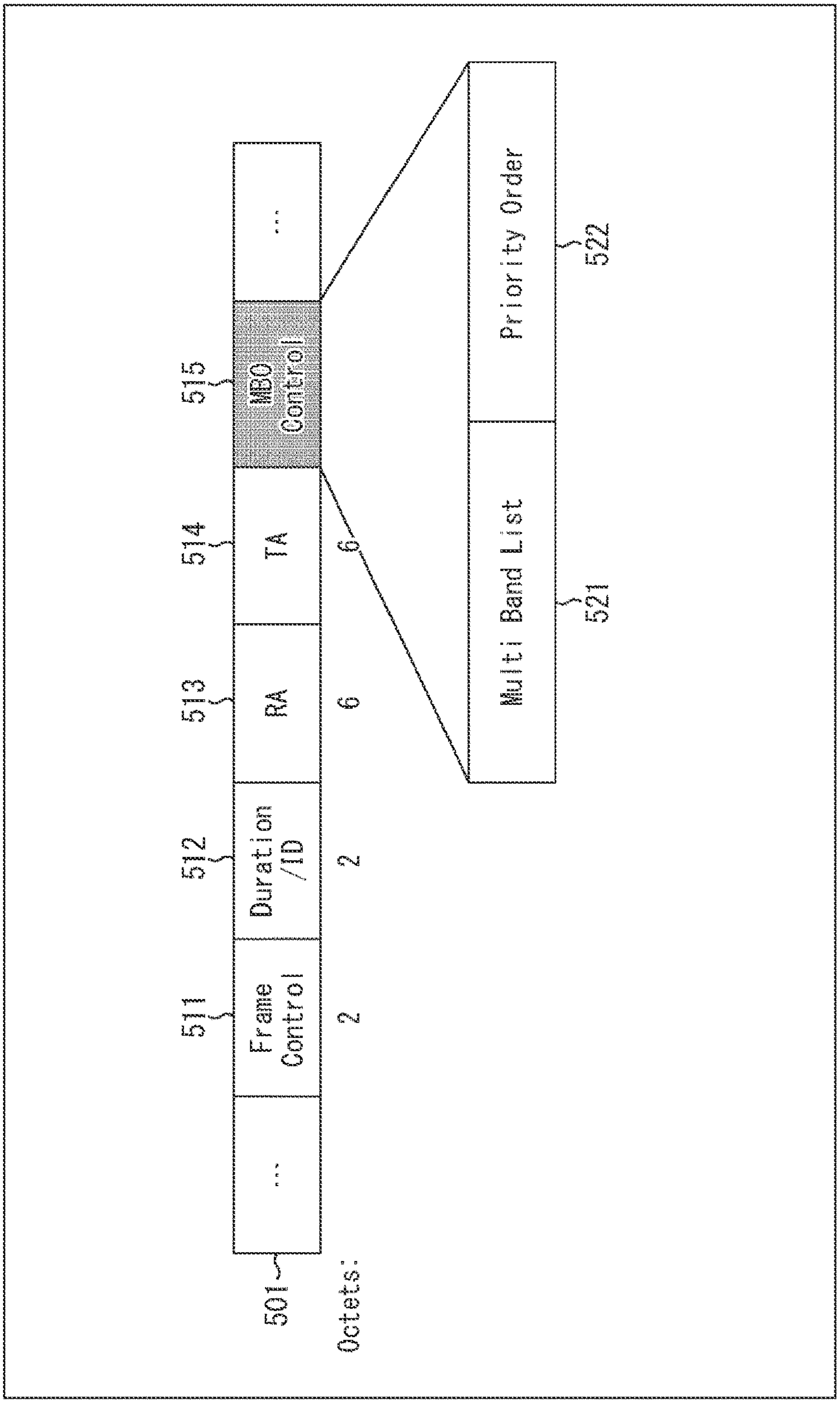
FIG. 14 is a diagram illustrating an example of the main configuration of an MB Req-I frame.

The configuration of the frame of above-described MB Req-I will be described next. FIG. 14 is a diagram illustrating an example of the main configuration of the MB Req-I frame. As illustrated in FIG. 14, like the MB Req frame 301, an MB Req-I frame 501 includes, for example, Frame Control 511, Duration/ID 512, RA 513, TA 514, and MBO Control 515.

Frame Control 511 includes information indicating that the frame is an MB Request-I. Note that Frame Control 511 may include information pertaining to MBO Control 515. For example, Frame Control 511 may include information indicating the presence or absence of MBO Control 515. In other words, MBO Control 515 can be omitted. Frame Control 511 may also include information indicating the length of MBO Control 515.

Duration/ID 512 to TA 514 are basically the same as Duration/ID 312 to TA 314, respectively.

For example, Duration/ID 512 includes information indicating the length of the frame. RA 513 includes information indicating that the frame is intended to be received by the base station (AP) 101. This information includes, for example, a MAC address indicating the base station 101. TA 514 includes information indicating that the frame was transmitted by the terminal device (STA) 102. This information includes, for example, a MAC address indicating the terminal device 102.

MBO Control 515 includes information for limiting the candidates for the frequency band and frequency bandwidth during multiband transmission, communicated by the MB Info. For example, this MBO Control 515 may include information indicating the candidates for the frequency band and frequency bandwidth to be used in multiband transmission (or a range of possible values). For example, information indicating a frequency band and frequency bandwidth the terminal device 102 can use for multiband transmission may be included as the information indicating the candidates. Additionally, for example, information indicating the frequency band and frequency bandwidth that the terminal device 102 uses preferentially (information indicating a priority of each candidate) may be included.

For example, this MBO Control 515 includes Multi Band List 521 and Priority Order 522. The Multi Band List 521 includes information indicating a frequency band and frequency bandwidth which may be communicated by the MB Info. In other words, the Multi Band List 521 may include information indicating the candidates for the frequency band and frequency bandwidth to be used in multiband transmission (or a range of possible values), such as that described above.

Priority Order 522 includes information pertaining to the priority of the candidates for the frequency bands and frequency bandwidths used in multiband transmission as described above, indicated in Multi Band List 521. For example, Priority Order 522 may include information indicating a priority order of the candidates indicated by Multi Band List 521.

Note that Multi Band List 521 and Priority Order 522 do not have to be stored in the order indicated in FIG. 14. For example, if information indicating a plurality of frequency bands and frequency bandwidths can be stored in Multi Band List 521, information indicating a priority order of the information may be stored immediately after the information indicating each frequency band and frequency bandwidth.

<MB Info Frame>

Figure 15:
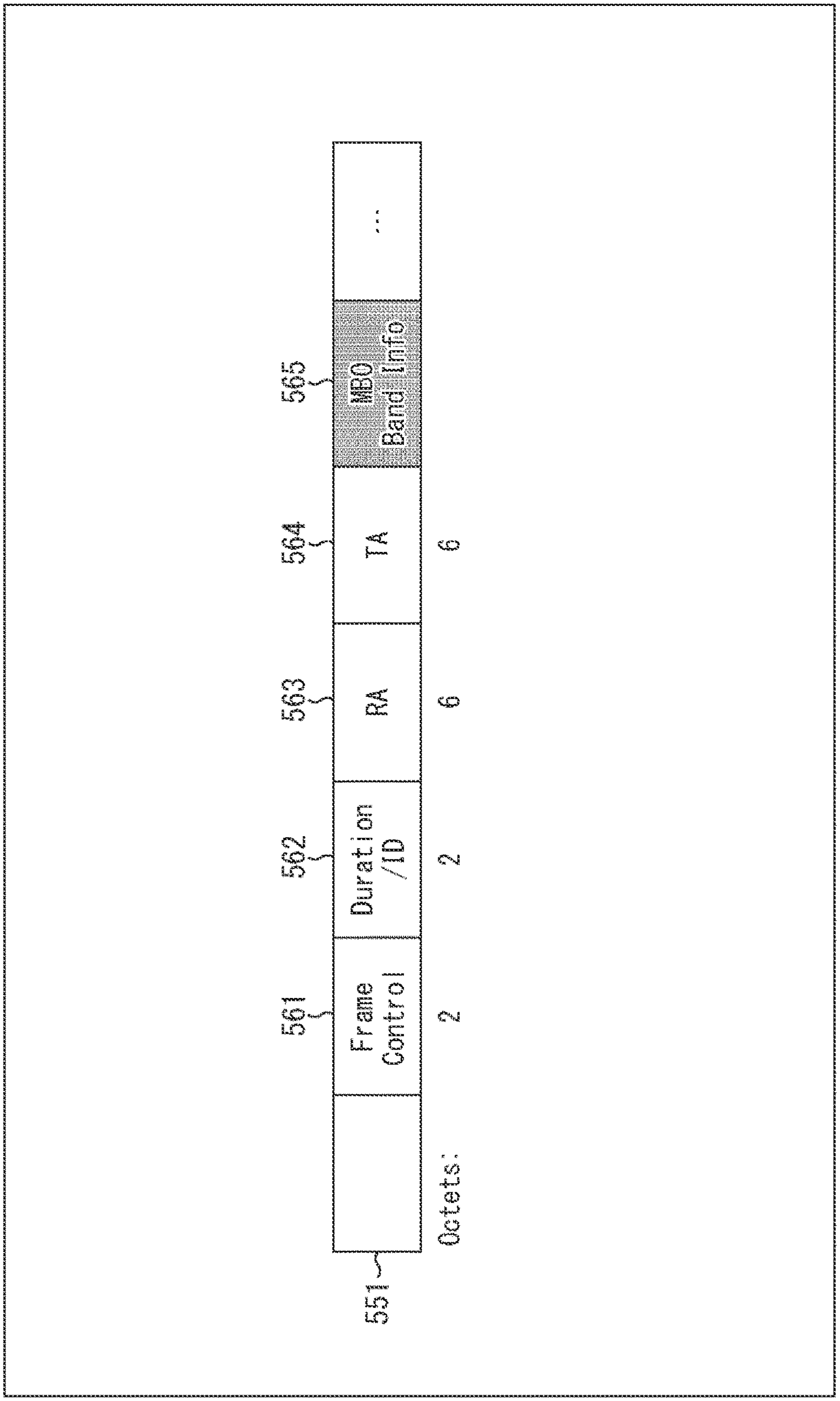
FIG. 15 is a diagram illustrating an example of the main configuration of an MB Info frame.

The configuration of the frame of above-described MB Info will be described next. FIG. 15 is a diagram illustrating an example of the main configuration of an MB Info frame. As illustrated in FIG. 15, like the MB Poll frame 351, an MB Info frame 551 includes, for example, Frame Control 561, Duration/ID 562, RA 563, TA 564, and MBO Band Info 565.

Frame Control 561, Duration/ID 562, RA 563, and TA 564 are the same as Frame Control 511, Duration/ID 512, RA 513, and TA 514, respectively, of the MB Req-I frame 501.

For example, Frame Control 561 includes information indicating that the frame is an MB Info. Note that Frame Control 561 may include information pertaining to the MBO Band Info 565. For example, Frame Control 561 may include information indicating that the MBO Band Info 565 is present in the frame. Frame Control 561 may also include information indicating the length of the MBO Band Info 565.

Duration/ID 562 includes information indicating the length of the frame. RA 563 includes information indicating that the frame is intended to be received by the terminal device (STA) 102. This information includes, for example, a MAC address indicating the terminal device 102. TA 564 includes information indicating that the frame was transmitted by the base station (AP) 101. This information includes, for example, a MAC address indicating the base station 101.

MBO Band Info 565 can include information indicating candidates for the frequency band and frequency bandwidth to be used for multiband transmission in the Data Transmission, which has been set by the base station 101. For example, candidates for the frequency band and frequency bandwidth to be used for multiband transmission, selected from the information included in the MB Req-I (e.g., a frequency band and frequency bandwidth which the terminal device 102 can use for multiband transmission), may be included in the MBO Band Info 565. Additionally, for example, information pertaining to the priority of each candidate may be included in the MBO Band Info 565. Note that if multiband transmission is not possible, this MBO Band Info 565 may include information indicating that multiband transmission is not possible.

<MB Configuration Processing by Terminal Device>

Figure 9:
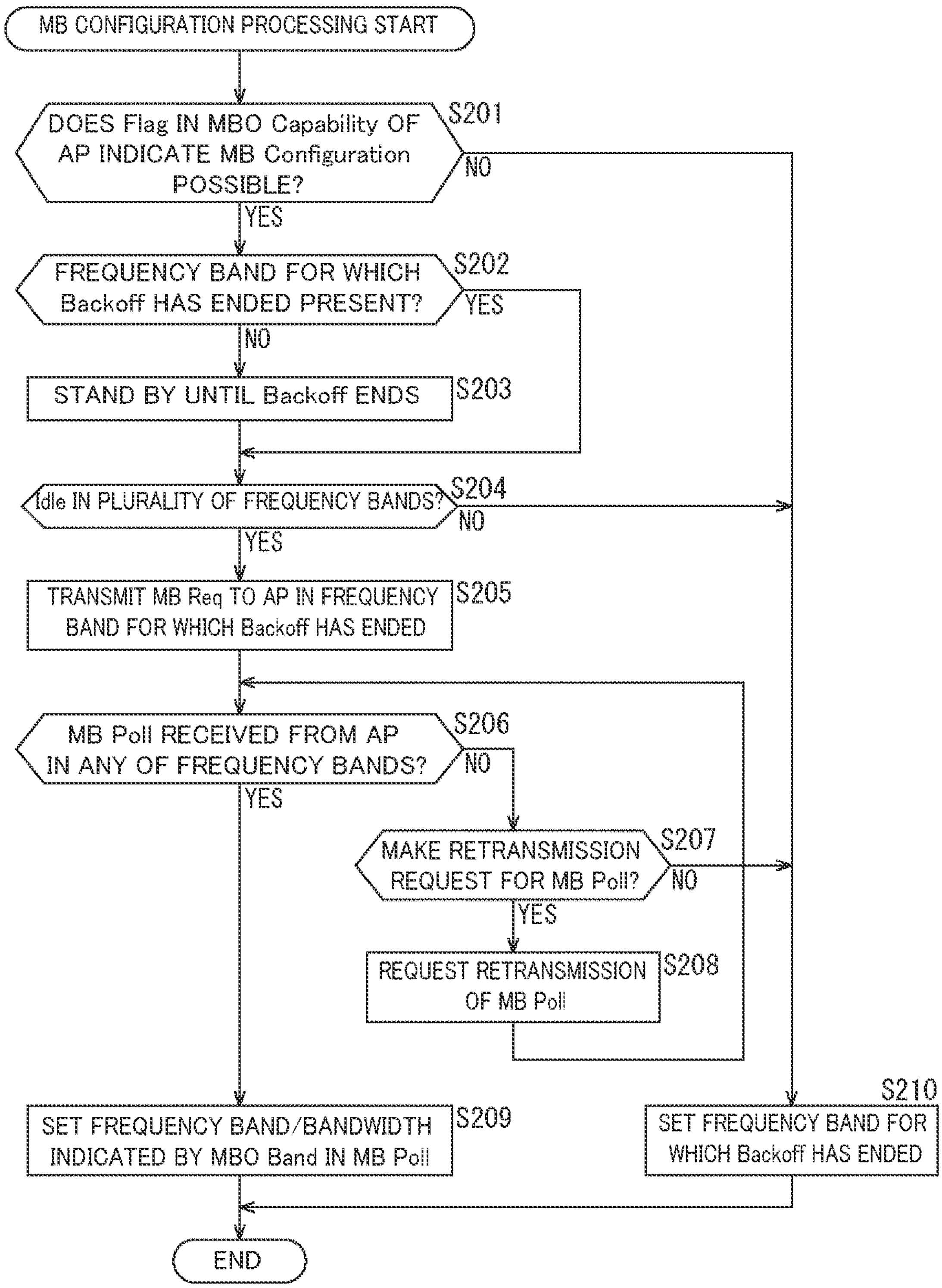
FIG. 9 is a flowchart illustrating an example of the flow of MB configuration processing performed by a terminal device.
Figure 16:
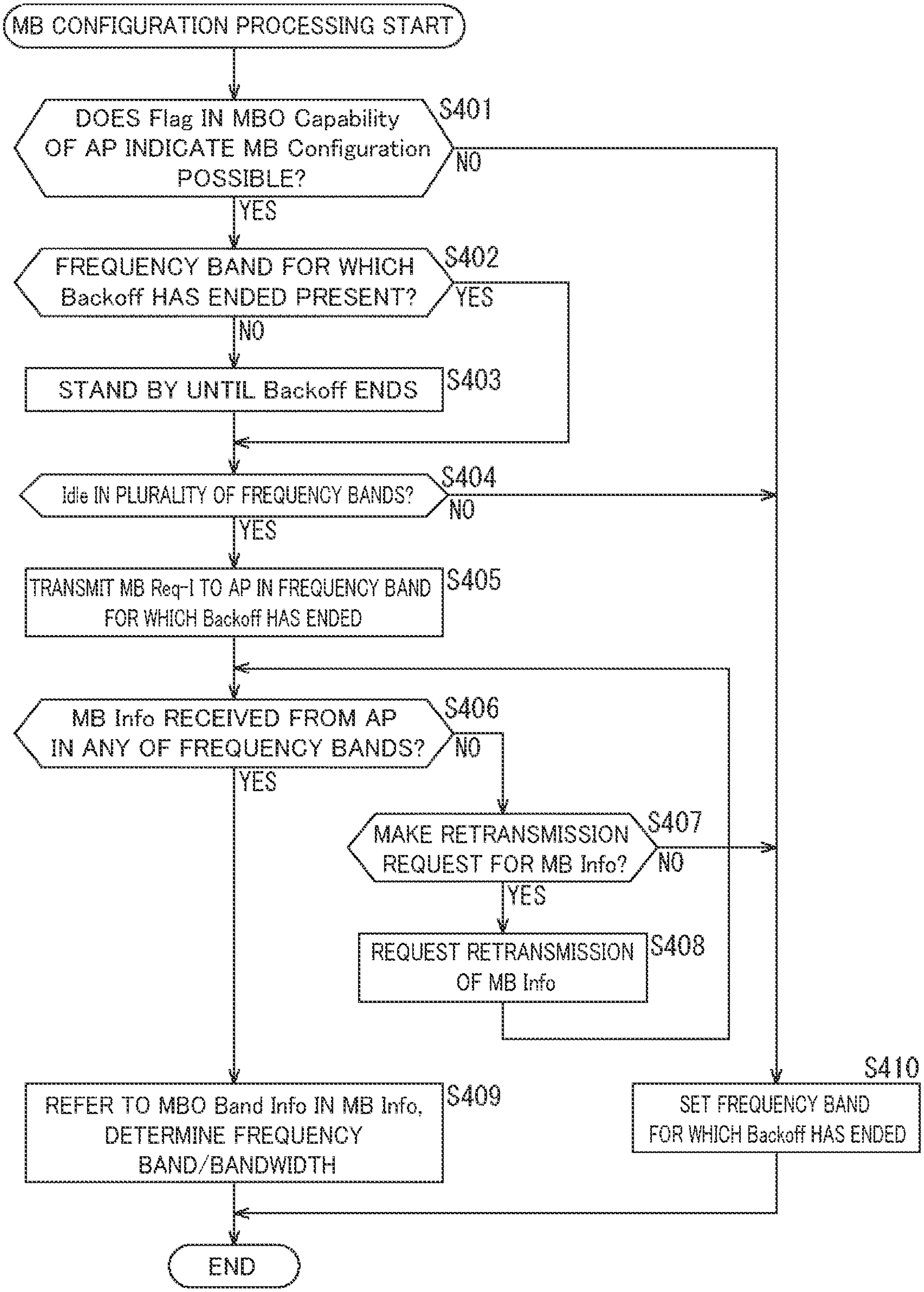
FIG. 16 is a flowchart illustrating another example of the flow of MB configuration processing performed by a terminal device.

An example of the flow of the MB configuration processing by the terminal device 102 according to the present embodiment will be described with reference to the flowchart in FIG. 16. In the present embodiment too, the control unit 121 of the terminal device 102 performs the MB configuration processing through basically the same flow as in the first embodiment (FIG. 9).

When the MB configuration processing is started, in step S401, the control unit 121 of the terminal device 102 refers to the capability information of the base station (AP) 101 obtained in the Capability Exchange (step S101) phase, and determines whether or not the MB Configuration of the present embodiment is indicated as being possible by Flag-I 421 of MBO Capabilities 411 in the capability frame 401.

If the information indicating that the base station 101 can execute the MB configuration is included in the Flag-I 421, and it is determined that the base station 101 is capable of executing the MB Configuration, the processing moves to step S402.

In step S402, the control unit 121 determines whether or not there is a frequency band in which the backoff has ended. If it is determined that there is no such frequency band, the processing moves to step S403.

In step S403, the control unit 121 stands by until the backoff ends. The processing moves to step S404 when the processing of step S403 ends. If it is determined in step S402 that there is a frequency band in which the backoff has ended, the processing of step S403 is skipped, and the processing moves to step S404.

In step S404, the control unit 121 determines whether or not a plurality of frequency bands among the frequency bands in which the terminal device 102 is capable of multiband transmission are idle. In other words, when the backoff ends in one of the frequency bands, the control unit 121 determines whether there is another frequency band that is in the Idle state.

In the present embodiment too, any method can be used to determine whether or not the state is the Idle state in step S404. For example, the state may be determined to be the Idle state when none of the following three conditions ((1) to (3)) are met.

(1) The wireless signal of the wireless communication system 100 is detected at a power greater than or equal to a first threshold.

(2) Some wireless signal, without being limited to the wireless communication system 100, is detected at a power greater than or equal to a second threshold.

(3) The wireless signal of the wireless communication system 100 is detected at a power greater than or equal to a third threshold during a set period up to the point in time when the base station 101 receives the MB Request-I. (However, this "set period" is assumed to include one or more wireless signal cycles. Additionally, the "third threshold" may also be defined for each frequency band and frequency bandwidth).

If it is determined in step S404 that a plurality of frequency bands are in the Idle state, i.e., when the backoff ends for one of the frequency bands, there is another frequency band in the Idle state, the processing moves to step S405.

In step S405, the control unit 121 controls the communication unit 123 or the communication unit 124 to acquire transmission rights in the frequency band in which the backoff has ended (Band 2, in the case of the example in FIG. 13), and to transmit the MB Request-I for multiband transmission to the base station 101 using that frequency band (Band 2, in the case of the example in FIG. 13). In other words, the control unit 121 causes the control signal for wireless communication in another frequency band to be transmitted in the frequency band which is capable of transmission.

The MB Announcement (MB Info) is transmitted from the base station 101 as a response signal to the MB Req-I transmitted in this manner. The communication unit 123, the communication unit 124, or both receive this MB Info. In step S406, the control unit 121 determines whether or not the communication unit 123, the communication unit 124, or both have received the MB Info in any of the frequency bands from the base station 101.

The processing moves to step S407 if it is determined that the MB Info has not been received in any of the frequency bands. In step S407, the control unit 121 determines whether or not to make a retransmission request for the MB Info. The processing moves to step S408 when it is determined to make a retransmission request. In step S408, the control unit 121 controls the communication unit 123, the communication unit 124, or both to request the base station 101 to retransmit the MB Info. Once the processing of step S408 ends, the processing returns to step S406, and the processing following thereafter is repeated. This retransmission request is repeated a predetermined number of times or for a predetermined period if no MB Info is received.

Then, in step S406, if it is determined that the MB Info has been received in any of the frequency bands, the processing moves to step S409.

In step S409, the control unit 121 refers to the MB Info received by the communication unit 123, the communication unit 124, or both, and determines the frequency band/frequency bandwidth to be used for multiband transmission in the Data Transmission from among the candidates for the frequency band/frequency bandwidth indicated in the MBO Band Info 565 of that MB Info frame 551 (the candidates for the frequency band/frequency bandwidth to be used for multiband transmission, set by the base station 101). In other words, in the present embodiment, the frequency band/frequency bandwidth to be used in multiband transmission is determined by the terminal device 102.

As described above, by determining the frequency band/frequency bandwidth to be used for multiband transmission, the MB configuration processing ends and transitions to the Data Transmission phase. In this case, multiband transmission is performed in the Data Transmission.

Note that when the received MB Info indicates that multiband transmission is not possible, the processing of step S410, described later, may be executed instead of the above-described processing of step S409.

Additionally, in step S401, if the information indicating that the base station 101 cannot execute the MB configuration is included in the Flag-I 421, and it is determined that the base station 101 is not capable of executing the MB Configuration, the processing moves to step S410. Additionally, in step S404, if it is determined that the plurality of frequency bands are not in the Idle state and multiband transmission cannot be performed, the processing moves to step S410. Additionally, in step S407, if the MB Info retransmission request is repeated a predetermined number of times or for a predetermined period and it is determined that no further MB Info retransmission requests are to be made, the processing moves to step S410.

In other words, in these cases, the control unit 121 gives up on the multiband transmission, and transmits the data using a single frequency band in which data can be transmitted (single-band transmission). In other words, in step S410, the control unit 121 controls the communication unit 123 or the communication unit 124, and determines the frequency band/frequency bandwidth for which the backoff has ended as the frequency band/frequency bandwidth to be used for data transmission (single-band transmission). In other words, in this case, the control unit 121 obtains the transmission rights independently for each frequency band.

Once the processing of step S410 ends, the MB configuration processing ends and transitions to the Data Transmission phase. In this case, single-band transmission is performed in the Data Transmission.

As in the first embodiment, in the present embodiment as well, any of the wireless control units 131 may perform the MB configuration processing, a plurality of the wireless control units 131 may perform the MB configuration processing cooperatively, or the control unit 121 and the wireless control unit 131 may perform the MB configuration processing cooperatively.

<MB Configuration Processing by Base Station>

Figure 10:
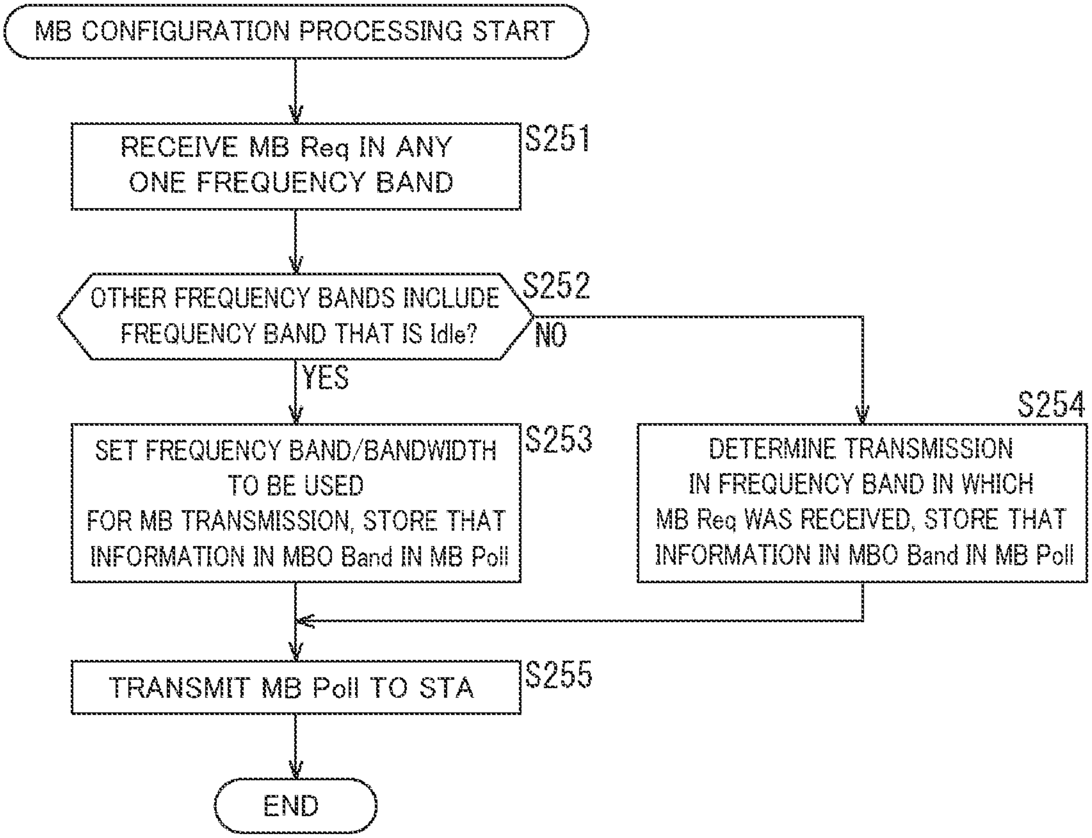
FIG. 10 is a flowchart illustrating an example of the flow of MB configuration processing performed by a base station.
Figure 17:
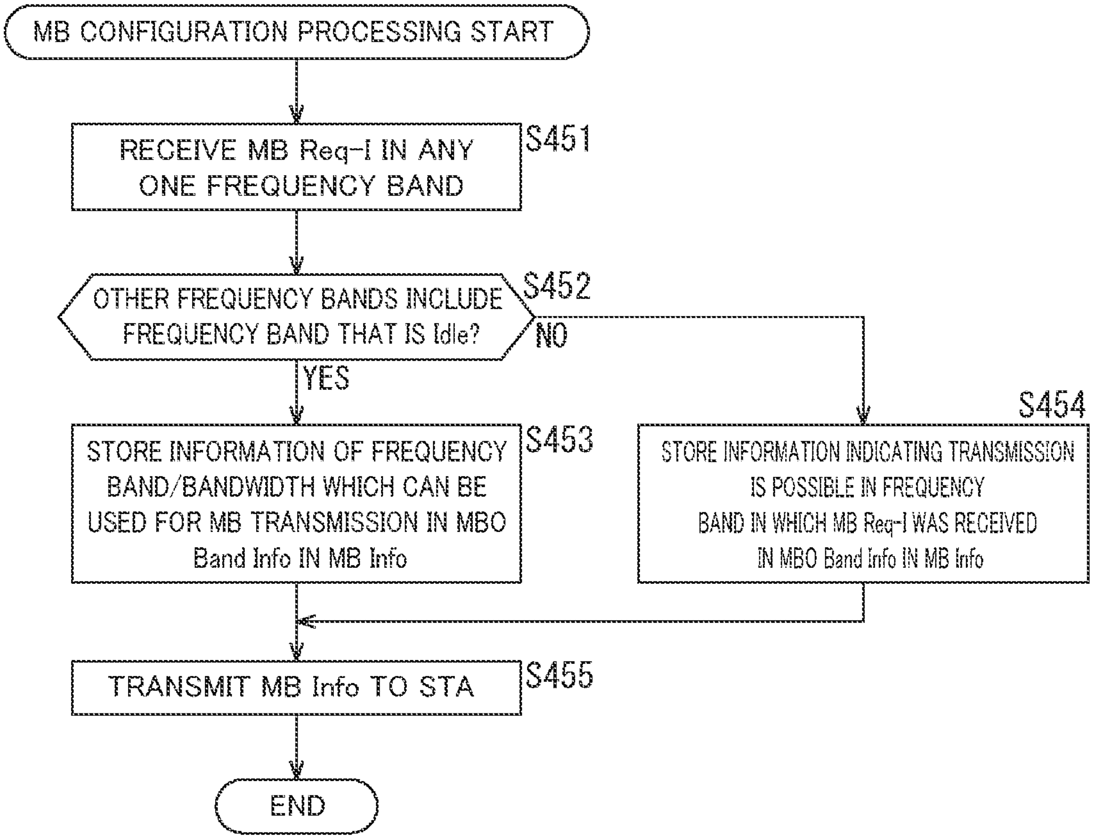
FIG. 17 is a flowchart illustrating another example of the flow of MB configuration processing performed by a base station.

As in the first embodiment, in the present embodiment, in the MB Configuration (step S103), the base station (AP) 101 executes the MB configuration processing in response to the MB configuration processing by the terminal device (STA) 102 described above. An example of the flow of the MB configuration processing by the base station 101 will be described with reference to the flowchart in FIG. 17. In the present embodiment too, the control unit 121 of the base station 101 performs the MB configuration processing through basically the same flow as in the first embodiment (FIG. 10).

When the MB configuration processing is started, in step S451, the control unit 121 of the base station 101 controls the communication unit 123 or the communication unit 124 and receives the MB Request-I, transmitted from the terminal device 102, in any of the frequency bands in which reception is possible.

In step S452, the control unit 121 determines whether or not there is a frequency band in the Idle state aside from the frequency band in which the MB Request-I was received. Any method can be used to determine whether or not the state is the Idle state. For example, the state may be determined to be the Idle state when none of the three conditions ((1) to (3)) described above in <MB Configuration Processing by Terminal Device> are met. When it is determined that there is a frequency band in the Idle state, the processing moves to step S453.

In step S453, the control unit 121 sets the frequency band/frequency bandwidth that can be used for multiband transmission (i.e., candidates for the frequency band/frequency bandwidth to be used for multiband transmission), and stores information indicating the set candidates in the MBO Band Info 565 of the MB Info frame 551. The processing moves to step S455 when the MB Info is generated in this manner.

Additionally, in step S452, if it is determined that there is no other frequency band in the Idle state, the processing moves to step S454.

In step S454, the control unit 121 stores information indicating that data can be transmitted in the frequency band in which the MB Request-I was received (or information indicating that multiband transmission is not possible) in the MBO Band Info 565 of the MB Info frame 551. The processing moves to step S455 when the MB Info is generated in this manner.

In step S455, the control unit 121 controls the communication unit 123, the communication unit 124, or both to transmit the MB Info generated in step S453 or step S454 to the terminal device 102 as a response signal to the MB Request-I. As described above with reference to FIG. 13, this MB Info can be transmitted in any frequency band.

Once the MB Info is transmitted in this manner, the MB configuration processing ends and transitions to the Data Transmission phase. In this case, multiband transmission or single-band transmission is performed in the Data Transmission. For example, if the MB Info has been generated through the processing of step S453, multiband transmission is performed in the Data Transmission. Alternatively, if the MB Info has been generated through the processing of step S454, single-band transmission is performed in the Data Transmission.

<Effects>

Like the first embodiment, in the present embodiment, by performing the MB configuration processing as described above, the terminal device 102 can shift a frequency band which is in an Idle state (a standby state) to a state in which transmission is possible immediately on the basis of the MB Info transmitted from the base station 101. This makes it possible for the terminal device 102 to suppress an increase in the transmission standby time caused by multiband transmission.

Additionally, by shortening this transmission standby time, the terminal device 102 can suppress a drop in the opportunities to acquire the transmission rights for multiband transmission in a random access scheme. Furthermore, by transmitting the MB Request-I using the frequency band for which transmission rights have already been acquired, the terminal device 102 can suppress the occurrence of collisions caused by transmitting the MB Request-I. Accordingly, a drop in the efficiency of frequency band usage by wireless communication can be suppressed (or more typically, the efficiency of usage can be improved) for the entire wireless communication system 100. Additionally, by transmitting the MB Info, the terminal device 102 can suppress the occurrence of collisions caused by other communication when receiving data, even if the back-off time is reduced.

Note that when the base station 101 transmits the same MB Info in a plurality of frequency bands, a diversity effect in those frequency bands can be obtained. This makes it possible to suppress a drop in the probability that the terminal device 102 will receive that MB Info (or more typically, improve that probability).

3. Supplementary Notes

<Other Configurations of Communication Devices>

Note that any configurations can be used for the base station 101 and the terminal device 102, and the configuration is not limited to the example in FIG. 2. For example, there may be three or more communication units. In other words, multiband transmission may be performed using three or more frequency bands as candidates. Note also that the multiband transmission may be performed using three or more frequency bands.

Figure 18:
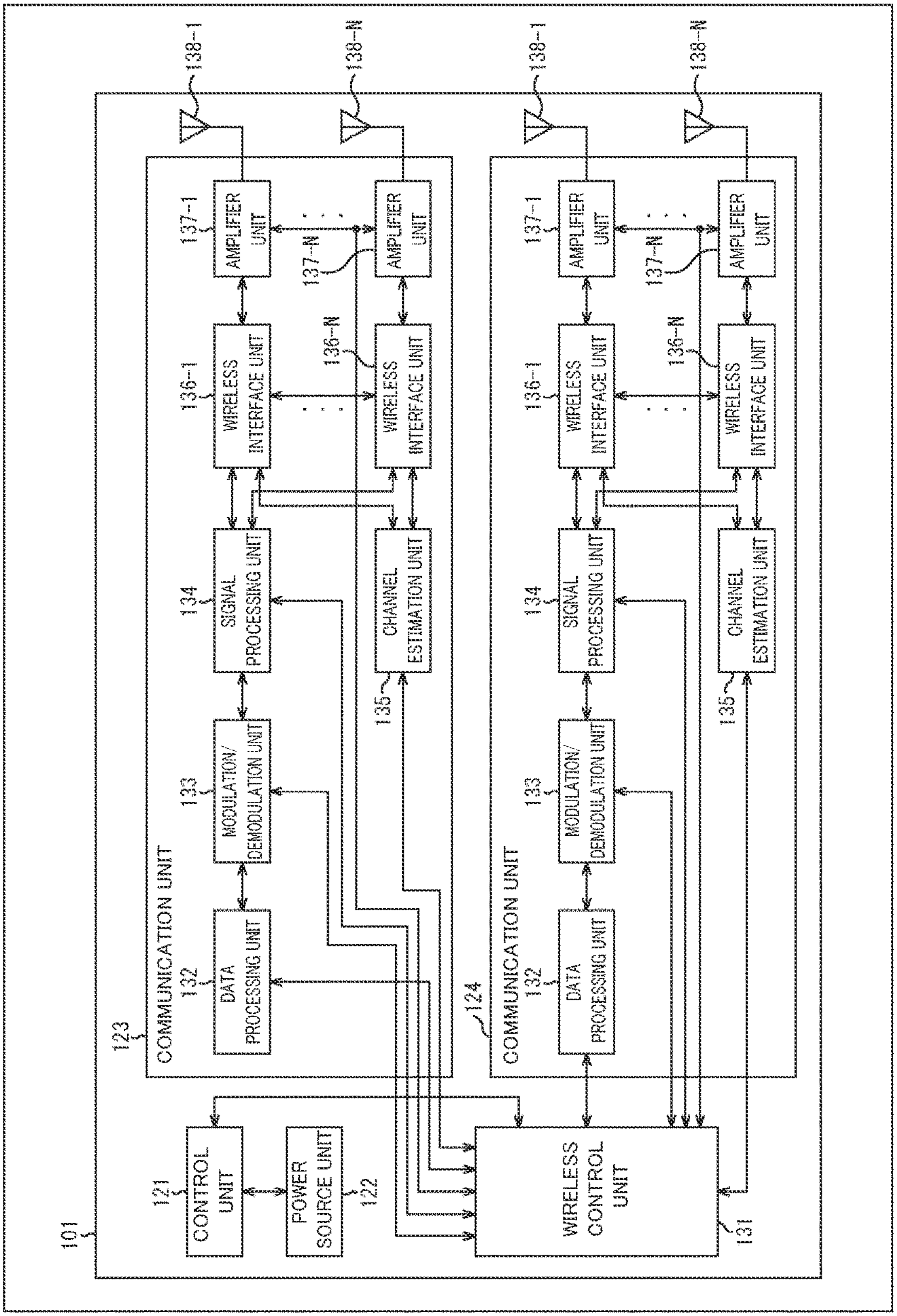
FIG. 18 is a block diagram illustrating another example of the configuration of a base station.

Additionally, although the communication unit 123 and the communication unit 124 may be separate constituent elements as in the example in FIG. 2, the configuration is not limited thereto, and some of the constituent elements among the communication unit 123 and the communication unit 124 may be shared. For example, a single wireless control unit 131 may be shared by the communication unit 123 and the communication unit 124, as illustrated in FIG. 18. In this case, the wireless control unit 131 can exchange information with each of the processing units in the communication unit 123 and the communication unit 124. Likewise, a single data processing unit 132 may be shared by the communication unit 123 and the communication unit 124. Likewise, a single modulation/demodulation unit 133 may be shared by the communication unit 123 and the communication unit 124.

Additionally, the amplifier unit 137 may have its own functions incorporated into the wireless interface unit 136 corresponding to that amplifier unit 137.

<Frequency Bands>

Although the foregoing describes the base station 101 and the terminal device 102 as handling a plurality of frequency bands (being capable of wireless communication in a plurality of frequency bands), and furthermore handling a plurality of channels in each frequency band, the configuration is not limited thereto, and the base station 101 and the terminal device 102 may be capable of handling a plurality of frequency bands and a single channel in each frequency band. In other words, the communication unit 123 and the communication unit 124 of the base station 101 and the terminal device 102 may each correspond to a single channel.

Additionally, the "frequency bands" used in the multiband transmission (synchronized transmission in a plurality of frequency bands) are not limited to the frequency bands (bands) described above in the first embodiment and the second embodiment, and may instead be channels to which the sets of the wireless interface unit 136 to the antenna 138 respectively correspond. In other words, the present technique can also be applied in synchronized transmission in a plurality of channels.

For example, the base station 101 and the terminal device 102 may handle a single frequency band and a plurality of channels in that frequency band. In other words, the base station 101 and the terminal device 102 may each include a single communication unit (the communication unit 123 or the communication unit 124), and may perform multiband transmission using a plurality of channels through that single communication unit.

<Transmission in Other Bands>

Note that the present technique can also be applied to purposes aside from multiband transmission control. For example, it is also possible to use a frequency band in which transmission is possible (e.g., Band 2) to send and receive control signals for wireless communication in another frequency band (e.g., Band 1), and on the basis of the control signals, start wireless communication in the other frequency band (e.g., Band 1) and end wireless communication in the frequency band in which the control signals were sent and received (e.g., Band 2). The present technique can also be applied in this kind of switching (updating) of the frequency band to be used.

<Computer>

The series of processing described above can be executed by hardware, and can be executed by software. In the case where the series of processing is executed by software, a program that configures the software is installed on a computer. Here, the computer includes, for example, a computer built in dedicated hardware and a general-purpose personal computer in which various programs are installed to be able to execute various functions.

Figure 19:
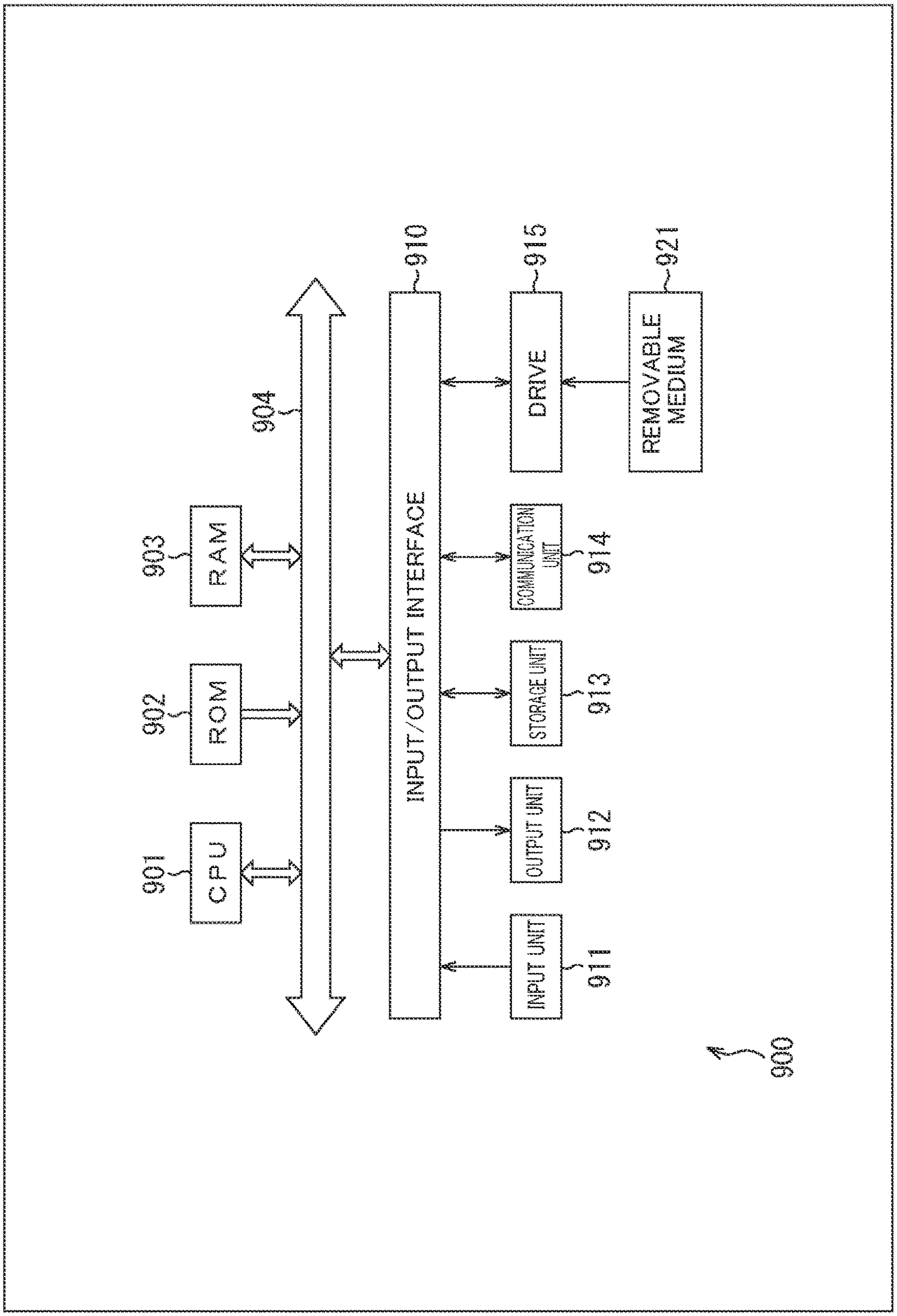
FIG. 19 is a block diagram illustrating an example of the main configuration of a computer.

FIG. 19 is a block diagram illustrating an example of hardware configuration of a computer that executes the series of processing described above according to a program.

In a computer 900 illustrated in FIG. 19, a Central Processing Unit (CPU) 901, Read Only Memory (ROM) 902, and Random Access Memory (RAM) 903 are connected to each other by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, and non-volatile memory, and the like. The communication unit 914 includes, for example, a network interface. The drive 915 drives a removable medium 921 such as a magnetic disk, an optical disc, a magneto-optical disk, semiconductor memory, or the like.

In the computer configured as described above, for example, the CPU 901 loads a program stored in the storage unit 913 into the RAM 903 via the input/output interface 910 and the bus 904 and executes the program to perform the series of processing described above. Data and the like necessary for the CPU 901 to execute the various kinds of processing is also stored as appropriate in the RAM 903.

The program executed by the computer can be recorded in, for example, the removable medium 921 as a package medium or the like and provided in such a form. In this case, the program may be installed in the storage unit 913 via the input/output interface 910 by inserting the removable medium 921 into the drive 915.

Additionally, the program may also be provided via a wired or wireless transmission medium such as a local area network, the Internet, or digital satellite broadcasting. In this case, the program can be received by the communication unit 914 and installed in the storage unit 913.

In addition, this program may be installed in advance in the ROM 902, the storage unit 913, or the like.

<Applications of Present Technique>

The present technique can be applied to any desired configuration. For example, the present technique can be applied as the configuration of part of a device, such as a processor serving as a system Large Scale Integration (LSI) circuit (e.g., a wireless communication processor), a module using a plurality of processors and the like (e.g., a wireless communication module), a unit using a plurality of modules and the like (e.g., a wireless communication unit), a set in which other functions are added to a unit (e.g., a wireless communication set), and the like.

For example, the present technique can also be applied in a network system constituted by a plurality of devices. For example, the present technique may be implemented as cloud computing shared and processed in common by a plurality of devices over a network. For example, the present technique may be implemented in a cloud service that provides services to any desired terminal, such as a computer, a mobile information processing terminal, an Internet of Things (IoT) device, or the like.

Note that, in the present specification, "system" means a set of a plurality of constituent elements (devices, modules (components), or the like), and it does not matter whether or not all the constituent elements are provided in a single housing. Therefore, a plurality of devices contained in separate housings and connected over a network, and one device in which a plurality of modules are contained in one housing, are both "systems".

<Fields and Applications in which Present Technique is Applicable>

A system, a device, a processing unit, or the like in which the present technique is applied can be used in any field, such as, for example, transportation, medical care, crime prevention, agriculture, livestock industry, mining, beauty, factories, home appliances, weather, nature monitoring, and the like. The application of the present technique can also be implemented as desired.

<Other>

The embodiments of the present technique are not limited to the above-described embodiments, and various modifications can be made without departing from the essential spirit of the present technique.

For example, configurations described as one device (or one processing unit) may be divided to be configured as a plurality of devices (or processing units). Conversely, configurations described as a plurality of devices (or processing units) in the foregoing may be collectively configured as one device (or one processing unit). Configurations other than those described above may of course be added to the configuration of each device (or each processing unit). Furthermore, part of the configuration of one device (or one processing unit) may be included in the configuration of another device (or another processing unit) as long as the configuration or operation of the entire system is substantially the same.

Additionally, for example, the program described above may be executed on any device. In this case, the device may have necessary functions (function blocks and the like) and may be capable of obtaining necessary information.

For example, each step of a single flowchart may be executed by a single device, or may be executed cooperatively by a plurality of devices. Furthermore, if a single step includes a plurality of processes, the plurality of processes may be executed by a single device or shared by a plurality of devices. In other words, the plurality of kinds of processing included in the single step may be executed as processing for a plurality of steps. Conversely, processing described as a plurality of steps may be collectively executed as a single step.

Additionally, for example, the program executed by the computer may be such that the processing steps describing the program are executed in chronological order according to the order described in the present specification or are executed in parallel or individually at a necessary timing such as in response to a call. That is, as long as no contradiction arises, the processing steps may be executed in an order different from the order described above. Furthermore, the processing steps describing the program may be executed in parallel with the processing of another program or may be executed in combination with the processing of the other program.

Additionally, for example, the multiple techniques related to the present technique can be implemented independently on their own, as long as no contradictions arise. Of course, any number of modes of the present technique may be used in combination. For example, part or all of the present technique described in any of the embodiments may be implemented in combination with part or all of the present technique described in the other embodiments. Further, part or all of any of the above-described modes of the present technique may be implemented in combination with other techniques not described above.

The present technique can also take on the following configurations.

(1) A wireless communication device, including: a wireless communication unit capable of wireless communication in a plurality of frequency bands; and a control unit that controls the wireless communication unit to transmit a control signal in a second frequency band in which transmission is possible, the control signal being for wireless communication in a first frequency band.

(2) The wireless communication device according to (1), wherein the control signal is a control signal for synchronized transmission in at least two or more frequency bands among a plurality of frequency bands including the first frequency band and the second frequency band.

(3) The wireless communication device according to (1) or (2), wherein the control unit causes a control signal for transmission in the first frequency band in an idle state to be transmitted.

(4) The wireless communication device according to (3), wherein the control unit determines whether or not the first frequency band in the idle state is present, and if the first frequency band in the idle state is determined to be present, causes the control signal to be transmitted in the second frequency band.

(5) The wireless communication device according to any one of (1) to (4), wherein the control signal includes information indicating candidates for a frequency band in which the wireless communication is to be performed.

(6) The wireless communication device according to (5), wherein the control signal further includes information pertaining to a priority of the candidates.

(7) The wireless communication device according to any one of (1) to (6), wherein the control signal includes information pertaining to a period in which the wireless communication is performed.

(8) The wireless communication device according to any one of (1) to (7), wherein the wireless communication unit receives a response signal corresponding to the control signal in at least one frequency band among a plurality of frequency bands.

(9) The wireless communication device according to (8), wherein the wireless communication unit receives the response signal in a plurality of frequency bands.

(10) The wireless communication device according to (8) or (9), wherein the response signal includes information pertaining to a period in which the wireless communication is performed.

(11) The wireless communication device according to any one of (8) to (10), wherein the response signal includes information indicating a frequency band in which the wireless communication is to be performed.

(12) The wireless communication device according to (11), wherein the control unit controls the wireless communication unit to perform wireless communication in a frequency band specified by the control signal received by the wireless communication unit.

(13) The wireless communication device according to any one of (8) to (12), wherein the response signal includes information indicating candidates for a frequency band in which the wireless communication is to be performed.

(14) The wireless communication device according to (13), wherein the control unit controls the wireless communication unit to select a frequency band to use from the candidates indicated in the control signal received by the wireless communication unit, and perform wireless communication in the frequency band selected.

(15) The wireless communication device according to any one of (1) to (14), wherein the control unit controls the wireless communication unit to exchange capability information.

(16) The wireless communication device according to (15), wherein the capability information includes information pertaining to whether or not the control signal and a response signal corresponding to the control signal can be transmitted and received.

(17) The wireless communication device according to (15) or (16), wherein the capability information includes information pertaining to a frequency band in which the wireless communication unit can perform wireless communication.

(18) A wireless communication method, including: controlling a wireless communication unit capable of wireless communication in a plurality of frequency bands to transmit a control signal in a second frequency band in which transmission is possible, the control signal being for wireless communication in a first frequency band.

(19) A wireless communication device, including: a wireless communication unit capable of wireless communication in a plurality of frequency bands; and a control unit that controls the wireless communication unit to receive a control signal in a second frequency band in which reception is possible, the control signal being for wireless communication in a first frequency band.

(20) A wireless communication method, including: controlling a wireless communication unit capable of wireless communication in a plurality of frequency bands to receive a control signal in a second frequency band in which reception is possible, the control signal being for wireless communication in a first frequency band.

REFERENCE SIGNS LIST

100 Wireless communication system
101 Base station

102 Terminal device
121 Control unit
122 Power source unit
123 Communication unit
124 Communication unit
131 Wireless control unit
132 Data processing unit
133 Modulation/demodulation unit
134 Signal processing unit
135 Channel estimation unit
136 Wireless interface unit
137 Amplifier unit
138 Antenna
201 Capability frame
211 MBO Capabilities
221 Flag
222 A-Bandwidth
301 MB Req frame
315 MBO Control
321 Multi Band List
322 Priority Order
351 MB Poll frame
365 MBO Band
401 Capability frame
411 MBO Capabilities
421 Flag-I
422 A-Bandwidth
501 MB Req-I frame
515 MBO Control
521 Multi Band List
522 Priority Order
551 MB Info Frame
565 MBO Band Info

The invention claimed is:

1. A first wireless communication device, comprising:
circuitry configured to:
- control wireless communication in a plurality of frequency bands that includes a first frequency band and a second frequency band;
- determine a respective back-off period of each of the plurality of frequency bands;
- control transmission of a control signal to a second wireless communication device in the second frequency band based on an end of the respective back-off period for the second frequency band, wherein
  - the control signal includes first information that requests the second wireless communication device to provide a notification of the first frequency band in which the wireless communication is to be performed by the first wireless communication device,
  - the control signal is for the wireless communication in the first frequency band of the plurality of frequency bands, and
  - the control signal further includes second information that indicates a plurality of candidates for the first frequency band in which the wireless communication is to be performed by the first wireless communication device;
- determine execution of synchronized communication in the first frequency band and the second frequency band; and
- control reception of a response signal from the second wireless communication device based on the transmission of the control signal, wherein
  - the response signal includes third information that indicates the first frequency band among the plurality of frequency bands in which the wireless communication is to be performed by the first wireless communication device.

2. The first wireless communication device according to claim 1, wherein the control signal is a signal for synchronized transmission in two or more frequency bands among the plurality of frequency bands.

3. The first wireless communication device according to claim 1, wherein the circuitry is further configured to control the transmission of the control signal for the wireless communication in the first frequency band which is in an idle state.

4. The first wireless communication device according to claim 3, wherein the circuitry is further configured to:
- determine whether the first frequency band in the idle state is present; and
- based on a determination that the first frequency band in the idle state is present, control the transmission of the control signal in the second frequency band.

5. The first wireless communication device according to claim 1, wherein the control signal further includes fourth information that indicates a priority of the plurality of candidates.

6. The first wireless communication device according to claim 1, wherein the control signal further includes fourth information that indicates a specific period in which the wireless communication is performed.

7. The first wireless communication device according to claim 1, wherein
- the circuitry is further configured to control the reception of the response signal in at least one frequency band among the plurality of frequency bands, and
- the response signal corresponds to the control signal.

8. The first wireless communication device according to claim 7, wherein the circuitry is further configured to control the reception of the response signal in the plurality of frequency bands.

9. The first wireless communication device according to claim 7, wherein the response signal further includes fourth information that indicates a specific period in which the wireless communication is performed.

10. The first wireless communication device according to claim 1, wherein the circuitry is further configured to control the wireless communication in the first frequency band that is indicated by the third information.

11. The first wireless communication device according to claim 7, wherein the second information further indicates the plurality of candidates for the first frequency band in which the wireless communication is to be performed.

12. The first wireless communication device according to claim 11, wherein the circuitry is further configured to:
- select the first frequency band in which the wireless communication is to be performed from the plurality of candidates indicated by the second information; and
- control the wireless communication in the selected first frequency band.

13. The first wireless communication device according to claim 1, wherein the circuitry is further configured to control exchange of capability information between the first wireless communication device and the second wireless communication device.

14. The first wireless communication device according to claim 13, wherein the capability information includes information that indicates whether the control signal and the response signal corresponding to the control signal are transmittable and receivable.

15. The first wireless communication device according to claim 13, wherein the capability information includes information that indicates the first frequency band in which the wireless communication is to be performed by the first wireless communication device.

16. The first wireless communication device according to claim 1, wherein the circuitry is further configured to determine that the reception of the control signal is in the second frequency band.

17. A wireless communication method, comprising:

in a first wireless communication device:

determining a respective back-off period of each of a plurality of frequency bands that includes a first frequency band and a second frequency band;

controlling, based on an end of the respective back-off period for the second frequency band, transmission of a control signal from the first wireless communication device to a second wireless communication device in the second frequency band, wherein wireless communication is possible in the plurality of frequency bands, the control signal includes first information that requests the second wireless communication device to provide a notification of the first frequency band among the plurality of frequency bands in which the wireless communication is to be performed by the first wireless communication device, the control signal is for the wireless communication in the first frequency band of the plurality of frequency bands, and the control signal further includes second information that indicates a plurality of candidates for the first frequency band in which the wireless communication is to be performed by the first wireless communication device;

determining execution of synchronized communication in the first frequency band and the second frequency band; and controlling reception of a response signal from the second wireless communication device based on the transmission of the control signal, wherein the response signal includes third information that indicates the first frequency band among the plurality of frequency bands in which the wireless communication is to be performed by the first wireless communication device.

18. A first wireless communication device, comprising:

circuitry configured to:

control wireless communication in a plurality of frequency bands that includes a first frequency band and a second frequency band;

determine a respective back-off period of each of the plurality of frequency bands;

control, based on an end of the respective back-off period for the second frequency band, reception of a control signal from a second wireless communication device in the second frequency band, wherein the control signal includes first information that requests the first wireless communication device to provide a notification of the first frequency band in which the wireless communication is to be performed by the second wireless communication device, the control signal is for the wireless communication in the first frequency band of the plurality of frequency bands, and the control signal further includes second information that indicates a plurality of candidates for the first frequency band in which the wireless communication is to be performed by the first wireless communication device;

determine execution of synchronized communication in the first frequency band and the second frequency band; and control transmission of a response signal to the second wireless communication device based on the reception of the control signal, wherein the response signal includes third information that indicates the first frequency band among the plurality of frequency bands in which the wireless communication is to be performed by the second wireless communication device.

19. A wireless communication method, comprising:

in a first wireless communication device:

determining a respective back-off period of each of a plurality of frequency bands that includes a first frequency band and a second frequency band;

controlling, based on an end of the respective back-off period for the second frequency band, reception of a control signal by the first wireless communication device in the second frequency band, wherein wireless communication is possible in the plurality of frequency bands, the control signal includes first information that requests the first wireless communication device to provide a notification of the first frequency band among the plurality of frequency bands in which the wireless communication is to be performed by a second wireless communication device, the control signal is for the wireless communication in the first frequency band of the plurality of frequency bands, and the control signal further includes second information that indicates a plurality of candidates for the first frequency band in which the wireless communication is to be performed by the first wireless communication device;

determining execution of synchronized communication in the first frequency band and the second frequency band; and controlling transmission of a response signal to the second wireless communication device based on the reception of the control signal, wherein the response signal includes third information that indicates the first frequency band among the plurality of frequency bands in which the wireless communication is to be performed by the second wireless communication device.

* * * * *